US008701430B2

(12) United States Patent
Kitano et al.

(10) Patent No.: US 8,701,430 B2
(45) Date of Patent: Apr. 22, 2014

(54) COMPACT REFRIGERATION UNIT FOR TRAILER

(75) Inventors: Shigeichi Kitano, Osaka (JP); Yukio Nishihama, Osaka (JP); Keisuke Kudou, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 1465 days.

(21) Appl. No.: 12/301,439

(22) PCT Filed: May 17, 2007

(86) PCT No.: PCT/JP2007/060130
§ 371 (c)(1),
(2), (4) Date: Nov. 18, 2008

(87) PCT Pub. No.: WO2007/135948
PCT Pub. Date: Nov. 29, 2007

(65) Prior Publication Data
US 2009/0113914 A1 May 7, 2009

(30) Foreign Application Priority Data
May 19, 2006 (JP) .................. 2006-140748

(51) Int. Cl.
B60H 1/32 (2006.01)
F25D 11/00 (2006.01)
F25D 19/00 (2006.01)

(52) U.S. Cl.
CPC ............ *F25D 11/003* (2013.01); *F25D 19/003* (2013.01); *B60H 1/3226* (2013.01); *B60H 1/3229* (2013.01); *B60H 1/3232* (2013.01)
USPC .................. 62/239; 62/244; 62/263

(58) Field of Classification Search
USPC .............................. 62/239, 323.1, 323.3, 244
See application file for complete search history.

(56) References Cited

U.S. PATENT DOCUMENTS

| 2,592,712 A | * | 4/1952 | Knoy ............................. 62/101 |
| 2,694,553 A | | 11/1954 | Hicke et al. |
| 2,724,245 A | * | 11/1955 | Swinburne ..................... 62/278 |
| 2,735,277 A | * | 2/1956 | Clark ........................... 62/323.1 |
| 2,793,834 A | | 5/1957 | Henney, et al. |
| 2,881,600 A | * | 4/1959 | Elfving ......................... 62/239 |

(Continued)

FOREIGN PATENT DOCUMENTS

| JP | 04302925 A | * | 10/1992 | ............... F24F 1/02 |
| JP | 5-38933 | | 2/1993 |

(Continued)

Primary Examiner — Allen Flanigan
(74) Attorney, Agent, or Firm — Birch, Stewart, Kolasch & Birch, LLP.

(57) ABSTRACT

A refrigeration unit body (31) is mounted to a trailer (20). The refrigeration unit body (31) includes a refrigerant circuit (40), an engine (50) and an electric generator (51). The refrigeration unit body (31) has a condensation side passage (70) formed from the front surface of the refrigeration unit body (31) to the top thereof. In the condensation side passage (70), a condenser (42) and an electrical component box (54) are disposed in series with condenser fans (44) for the condenser (42) and a radiator (55) in order from upstream to downstream of air flow. In addition, the refrigeration unit body (31) has an evaporation side passage (71) formed therein. The condenser fans (44) in the condensation side passage (70) and evaporation fans in the evaporation side passage are disposed alternately in the width direction of the refrigeration unit body (31).

11 Claims, 25 Drawing Sheets

(56) References Cited

U.S. PATENT DOCUMENTS

| | | | |
|---|---|---|---|
| 2,984,084 A * | 5/1961 | Talmey et al. | 62/239 |
| 3,359,752 A * | 12/1967 | Westling et al. | 62/239 |
| 4,257,240 A * | 3/1981 | Christiansen et al. | 62/448 |
| 4,351,162 A * | 9/1982 | Yee | 62/239 |
| 4,424,684 A * | 1/1984 | Waldschmidt et al. | 62/239 |
| 4,736,597 A * | 4/1988 | Anderson et al. | 62/239 |
| 4,748,824 A * | 6/1988 | Wakabayashi et al. | 62/239 |
| 4,811,569 A * | 3/1989 | Welch et al. | 62/239 |
| 5,123,257 A * | 6/1992 | Anderson et al. | 62/236 |
| 5,927,090 A * | 7/1999 | Ladendorf et al. | 62/239 |
| 6,062,030 A * | 5/2000 | Viegas | 62/175 |
| 6,155,335 A * | 12/2000 | Acre et al. | 165/41 |
| 6,354,101 B1 * | 3/2002 | Levitin et al. | 62/305 |
| 6,708,507 B1 * | 3/2004 | Sem et al. | 62/126 |

FOREIGN PATENT DOCUMENTS

| | | | | |
|---|---|---|---|---|
| JP | 11-23128 A | | 1/1999 | |
| JP | 11-294931 A | | 10/1999 | |
| JP | 11294931 A | * | 10/1999 | F25D 19/00 |
| JP | 2003-269835 A | | 9/2003 | |
| JP | 2004-3705 A | | 1/2004 | |
| JP | 2004-93128 A | | 3/2004 | |

* cited by examiner

COMPACT REFRIGERATION UNIT FOR TRAILER

TECHNICAL FIELD

This invention relates to refrigeration units for trailers and particularly relates to the body structure of such a refrigeration unit.

BACKGROUND ART

Refrigeration units are conventionally known that are provided in refrigerated vehicles for transporting refrigerated food products, such as frozen food products, by land and cool their refrigerated compartments (see, for example, Patent Document 1). The refrigeration unit includes a sub-engine different from a driving engine for driving a refrigerated vehicle and an electric compressor driven by the sub-engine and is mounted on the bed of the refrigerated vehicle.
Patent Document 1: Published Japanese Patent Application No. H05-38933

DISCLOSURE OF THE INVENTION

Problem to be Solved by the Invention

In the refrigeration unit disclosed in the above-stated Patent Document 1, however, no particular consideration is given to the arrangement of its components, such as a condenser and an evaporator, which causes the problem of large installation space.

Particularly in refrigeration units for trailers, there is strong demand for thickness reduction because of the need to create a sufficiently large cargo space.

The present invention has been made in view of the foregoing point and an object thereof is to reduce the thickness of a refrigeration unit body.

Means to Solve the Problem

A first aspect of the invention is directed to a trailer refrigeration unit that is mounted to a trailer, has a refrigeration unit body containing a refrigerant circuit operable in a vapor compression refrigeration cycle and an engine for driving a compressor of the refrigerant circuit and is configured to cool the interior of the trailer.

Furthermore, the refrigeration unit body has a condensation side passage formed therein from the front surface to the top of the refrigeration unit body to allow air exchanging heat with a condenser of the refrigerant circuit to flow through the condensation side passage. The condensation side passage is configured so that the air having flowed through the condenser then flows through a radiator for the engine.

In the first aspect of the invention, air exchanging heat with the condenser flows through the refrigeration unit body from its front surface to its top.

A second aspect of the invention is the trailer refrigeration unit according to the first aspect of the invention, wherein the condenser, a condenser fan for the condenser and the radiator are disposed in series in the condensation side passage and in this order from upstream to downstream of air flow.

In the second aspect of the invention, air in the condensation side passage flows through the condenser, the condenser fan and the radiator in this order.

A third aspect of the invention is the trailer refrigeration unit according to the first aspect of the invention, wherein a condenser fan for the condenser is disposed in the condensation side passage and an electrical component box is disposed in the condensation side passage upstream of the condenser fan.

A fourth aspect of the invention is the trailer refrigeration unit according to the first aspect of the invention, wherein the radiator is disposed at the top of the refrigeration unit body.

A fifth aspect of the invention is the trailer refrigeration unit according to the first aspect of the invention, wherein the refrigeration unit body has an evaporation side passage formed therein to allow air exchanging heat with an evaporator of the refrigerant circuit to flow through the evaporation side passage. Furthermore, the condenser fan for the condenser in the condensation side passage and an evaporator fan for the evaporator in the evaporation side passage are arranged in a width direction of the refrigeration unit body.

A sixth aspect of the invention is the trailer refrigeration unit according to the fifth aspect of the invention, wherein the refrigeration unit body includes a partition plate separating the condensation side passage from the evaporation side passage in a front to back direction thereof, the partition plate being formed in a three-dimensional shape according to air flows in the condenser and the evaporator.

A seventh aspect of the invention is the trailer refrigeration unit according to the first aspect of the invention, wherein the evaporator of the refrigerant circuit is disposed inclined with the top thereof backwardly of the bottom thereof.

An eighth aspect of the invention is the trailer refrigeration unit according to the first aspect of the invention, wherein the refrigeration unit body includes structural members formed in a frame structure including a frame.

A ninth aspect of the invention is the trailer refrigeration unit according to the eighth aspect of the invention, wherein the frame is joined to the trailer.

A tenth aspect of the invention is the trailer refrigeration unit according to the first aspect of the invention, wherein the refrigeration unit body further contains an electric generator capable of being driven by the engine, and a heat exhaust passage for the engine and the electric generator is formed in the refrigeration unit body along an exhaust pipe of the engine and opens at the top of the refrigeration unit body to guide exhaust heat upward.

In the tenth aspect of the invention, since the heat exhaust passage is formed along the exhaust pipe, exhaust heat can surely be discharged through the heat exhaust passage by stack effect due to high heat of a muffler.

An eleventh aspect of the invention is the trailer refrigeration unit according to the first aspect of the invention, wherein a service opening is formed in the back surface of the refrigeration unit body located towards the trailer.

In the eleventh aspect of the invention, various maintenance services are carried out through the service opening.

A twelfth aspect of the invention is the trailer refrigeration unit according to the first aspect of the invention, wherein a heat insulating wall is provided on the back side of the refrigeration unit body located towards the trailer.

In the twelfth aspect of the invention, the heat insulating wall fits in the front surface of the trailer to form part of the front wall of the trailer.

Effects of the Invention

According to the present invention, since the condensation side passage is formed in the refrigeration unit body from the front surface to the top thereof, the refrigeration unit body can be reduced in thickness and can surely be prevented from the occurrence of short circuit.

According to the second aspect of the invention, since the condenser and the electrical component box are disposed in series with the condenser fan and the radiator, a sufficient amount of air flow can be obtained with a small amount of power, thereby providing efficient heat exhaust.

According to the fourth aspect of the invention, since the radiator is disposed on the downstream side of the condensation side passage, exhaust heat can surely be discharged.

According to the fifth aspect of the invention, since the condenser fan and the evaporator fan are disposed in the width direction of the refrigeration unit body, this provides space saving and in turn reduces the thickness of the refrigeration unit body.

According to the sixth aspect of the invention, since the partition plate is formed in a three-dimensional shape to effectively form an air passage, the air flow can be smoothened.

According to the seventh aspect of the invention, since the evaporator is disposed inclined, the air in the refrigerated compartment of the trailer body is guided to the entire surface of the evaporator, which ensures the area of heat exchange. In addition, the evaporator can be reduced in depth and can be increased in height, which provides effective space utilization.

According to the eighth aspect of the invention, since the refrigeration unit body is formed in a frame structure, it can be toughened, can be unitized and can surely be joined to the trailer body.

According to the tenth aspect of the invention, since the heat exhaust passage is formed along the exhaust pipe, heat exhaust can surely be carried out by stack effect due to high heat of a muffler.

According to the eleventh aspect of the invention, since the service opening is formed in the refrigeration unit body, the maintenance of the electrical component box can be easily carried out.

According to the twelfth aspect of the invention, since the heat insulating wall forms part of the front wall of the trailer, the part of the front wall of the trailer can be dispensed with, thereby reducing the cost. In addition, the frame of the refrigeration unit body can be used also as the front frame of the trailer, whereby the front frame of the trailer can be dispensed with.

Figure 1:
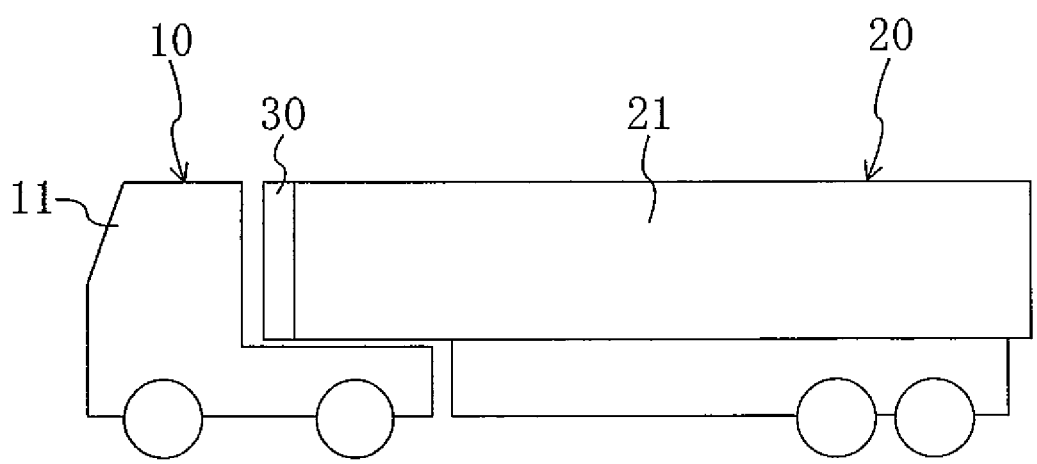
FIG. 1 is a schematic side view showing a refrigerated vehicle according to Embodiment 1.
Figure 2:
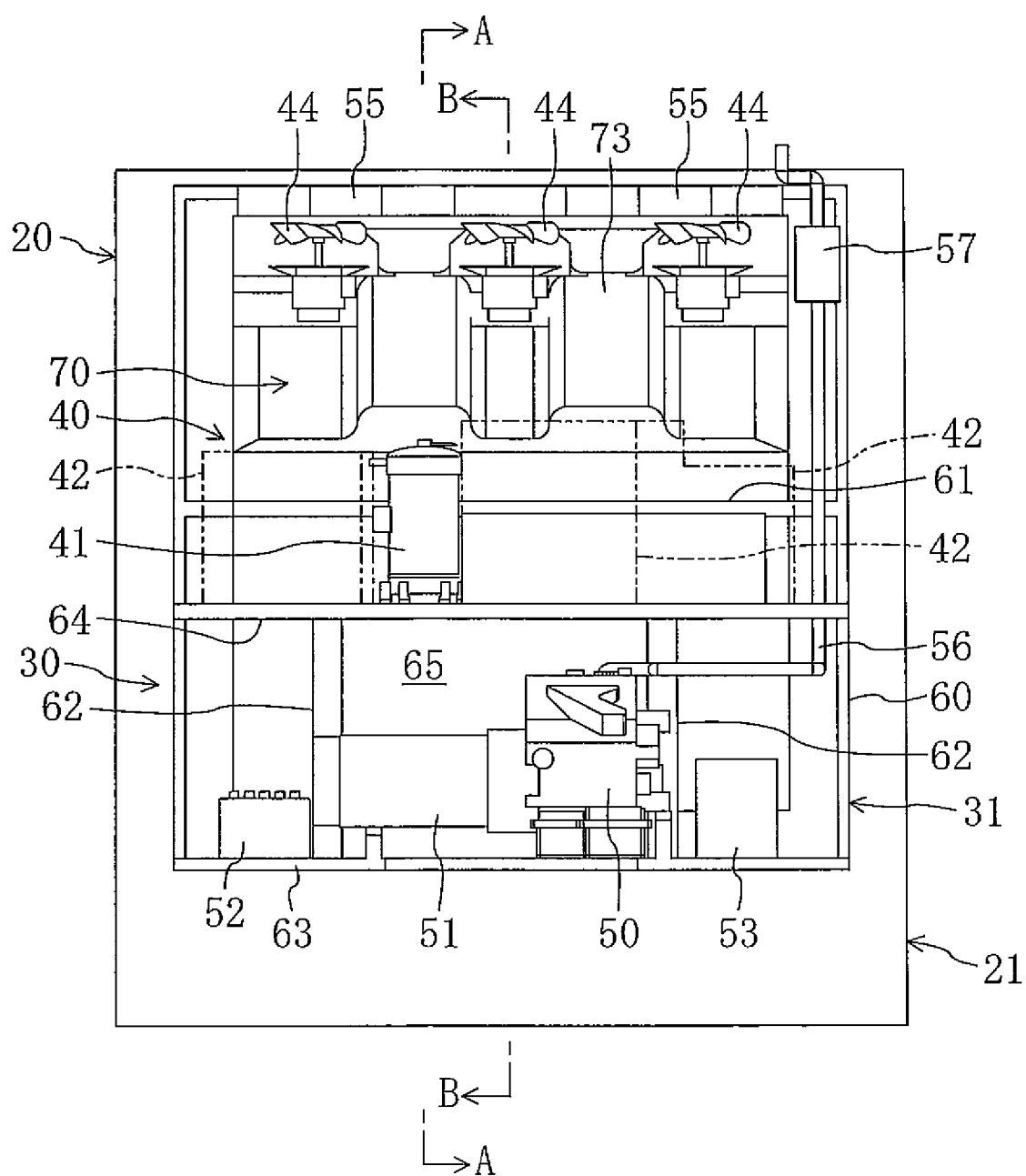
FIG. 2 is a partly omitted, front view showing a refrigeration unit according to Embodiment 1.
Figure 3:
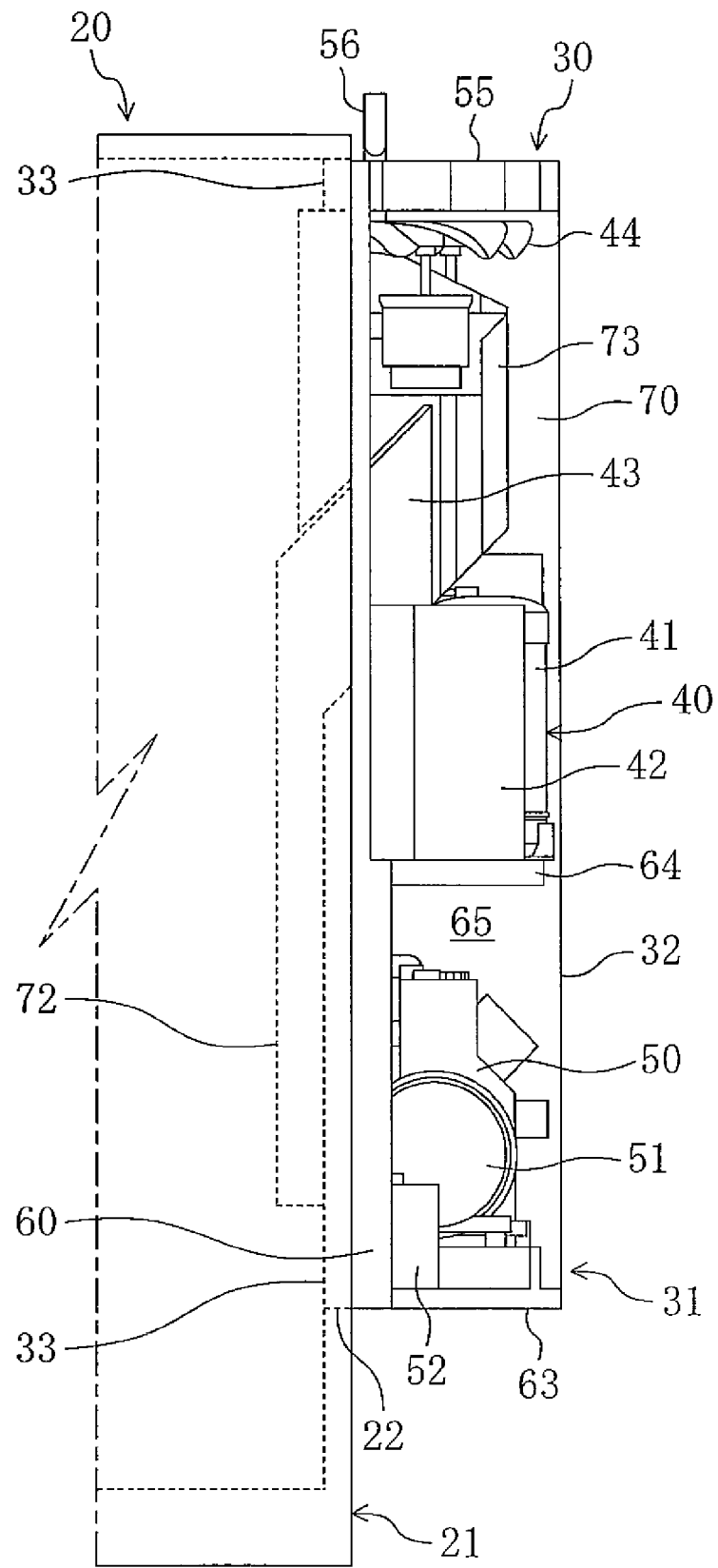
FIG. 3 is a partly omitted, left side view showing the refrigeration unit according to Embodiment 1.
Figure 4:
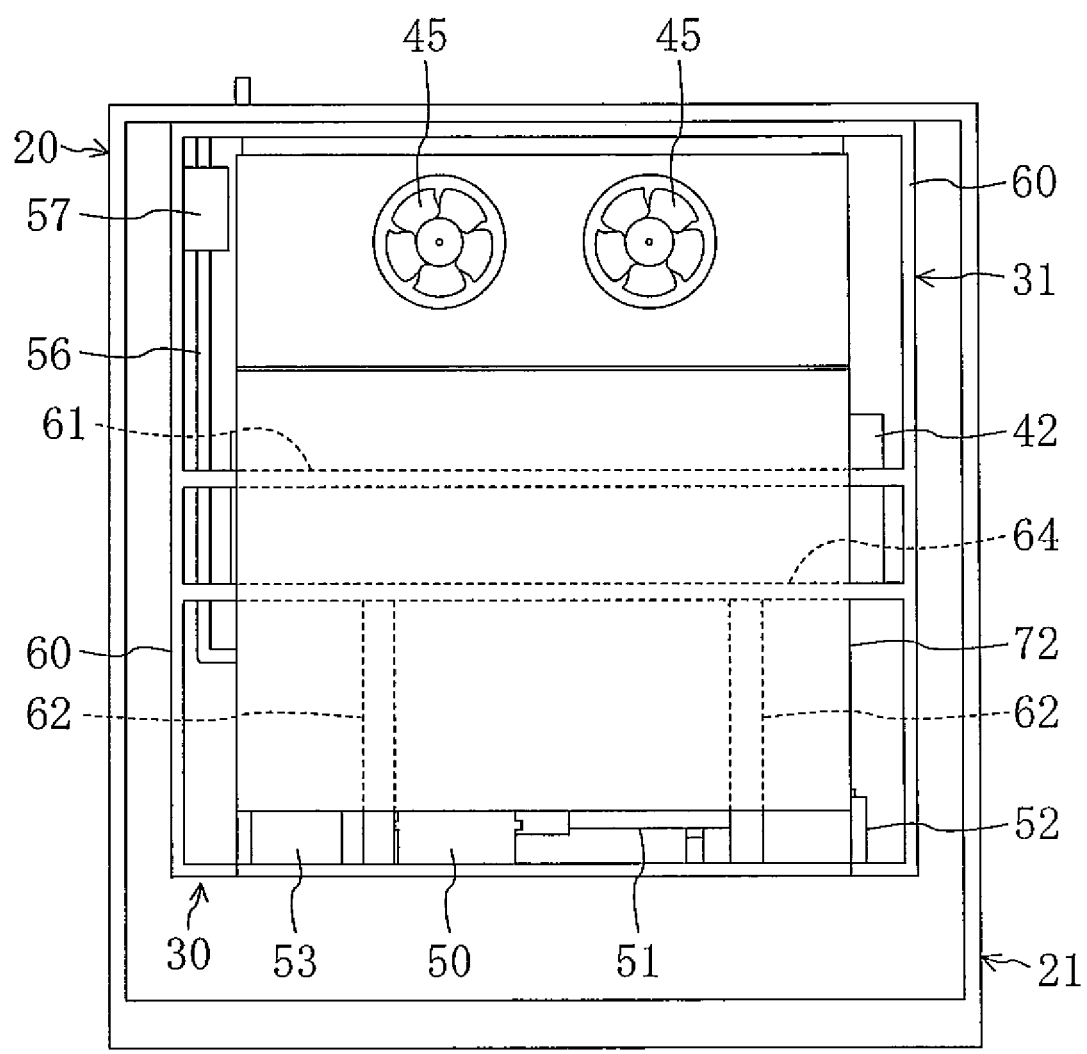
FIG. 4 is a partly omitted, back view showing the refrigeration unit according to Embodiment 1.
Figure 5:
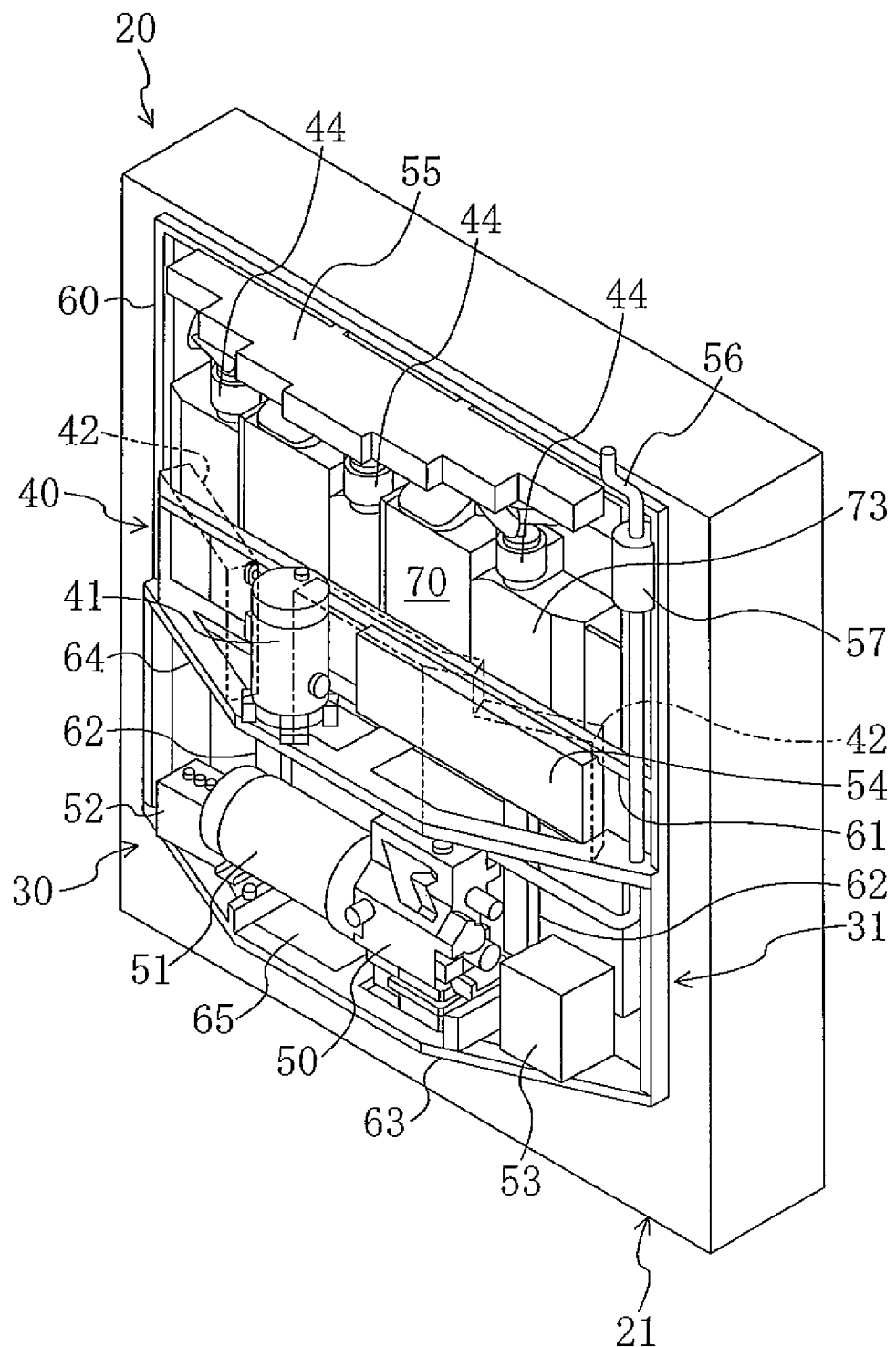
FIG. 5 is a partly omitted, perspective view showing the refrigeration unit according to Embodiment 1.

LIST OF REFERENCE NUMERALS 20 trailer
30 refrigeration unit
31 refrigeration unit body
33 heat insulating wall
40 refrigerant circuit
41 compressor
42 condenser
43 evaporator
44 condenser fan
45 evaporator fan
50 engine
51 electric generator
54 electrical component box
55 radiator
56 exhaust pipe
57 muffler
70 condensation side passage
71 evaporation side passage
73 partition plate

BEST MODE FOR CARRYING OUT THE INVENTION

Embodiments of the present invention will be described below in detail with reference to the drawings.

Embodiment 1 of the Invention

In this embodiment, as shown in FIG. 1, a refrigeration unit (30) for a trailer is applied to a large refrigerated vehicle (10) for transporting refrigerated food products, such as frozen food products or perishable food products, by land.

In the refrigerated vehicle (10), a trailer head (11) serving as a driver's vehicle with a driving engine (not shown) is separably connected to a trailer (20). The refrigeration unit (30) is mounted to the trailer (20) to cool the interior of the trailer body (21).

As shown in FIGS. 2 to 9, the refrigeration unit (30) includes a refrigeration unit body (31) including structural members formed in a frame structure. The refrigeration unit body (31) contains a refrigerant circuit (40), a generator engine (50) and an electric generator (51). The refrigerant circuit (40) includes a compressor (41), condensers (42), an expansion mechanism (not shown) and an evaporator (43) and is configured to operate in a vapor compression refrigeration cycle.

The frame structure of the refrigeration unit body (31) is composed of structural members including a frame (60), a cross member (61) joined to the frame (60), vertical members (62) joined to the frame (60), a lower-stage frame (63) joined to the lower end of the frame (60), and a middle-stage frame (64) joined to the vertical middle of the frame (60). Although not shown, the frame (60) is configured to be connected to structural members of the trailer body (21).

The refrigeration unit body (31) includes a casing (32) attached to the structural members including the frame (60), and the front of the casing (32) (the side thereof facing the trailer head (11)) is formed in an arcuate cross section. Thus, the refrigeration unit body (31) has a general shape of an arc in plan view.

The space between the lower-stage frame (63) and the middle-stage frame (64) is constituted into a machine room (65) in which the generator engine (50), the electric generator (51) connected to the engine (50), a battery (52) and an operation panel (53) are contained. The lower-stage frame (63) is composed of high-strength members in order to support heavy components, such as the engine (50).

Mounted on the middle-stage frame (64) are the compressor (41), the condensers (42) and an electrical component box (54) containing various electrical components. Mounted on the cross member (61) is the evaporator (43).

A heat insulating wall (33) is provided on the back side of the refrigeration unit body (31) (the side thereof located towards the trailer (20)). The heat insulating wall (33) is mounted to the frame (60) and formed to fit into an opening (22) formed in the front surface of the trailer body (21). Furthermore, the heat insulating wall (33) is configured to form part of the front wall of the trailer body (21).

The refrigeration unit body (31) has a condensation side passage (70) and an evaporation side passage (71) that are formed therein. The condensation side passage (70) is a passage through which air for exchanging heat with the condensers (42) flows. An inlet (not shown) for the condensation side passage (70) is formed in the casing (32) in front of the condensers (42). The condensation side passage (70) bends upward in the interior of the refrigeration unit body (31) from the inlet. The top of the refrigeration unit body (31) has an outlet (not shown) formed therein.

Disposed in the condensation side passage (70) are the above-stated condensers (42), the electrical component box (54), three condenser fans (44) and a radiator (55) for the engine (50). The radiator (55) is disposed at the outlet that is the downstream end of the condensation side passage (70). Particularly, the condensers (42) and the electrical component box (54) are disposed in series with the condenser fans (44) and the radiator (55) in the condensation side passage (70) in order from upstream to downstream of air flow.

The evaporation side passage (71) is a passage through which air for exchanging heat with the evaporator (43) flows, and is formed to extend from an intake duct (72) to outlets (7a) in an upper part of the back surface of the refrigeration unit body (31). Disposed in the evaporation side passage (71) are the evaporator (43) and two evaporator fans (45).

The intake duct (72) is provided on the back surface of the heat insulating wall (33) of the refrigeration unit body (31), located in the interior of the trailer body (21) and configured to take in the air in the refrigerated compartment of the trailer body (21) from a lower part of the front surface of the trailer body (21). The intake duct (72) is thermally insulated from the machine room (65) containing the engine (50) by the heat insulating wall (33).

The evaporator (43) is disposed at the upper end of the intake duct (72). The evaporation side passage (71) is configured to discharge cooled air through the outlets (7a) in the upper part of the back surface of the refrigeration unit body (31) to the interior of the trailer body (21).

In other words, the evaporation side passage (71) extends upward from the lower part of the back surface of the refrigeration unit body (31) along the intake duct (72), bends frontward from the vertical middle of the back surface, then bends upward and then bends backward at an upper part of the refrigeration unit body (31). The evaporator (43) is disposed in a substantially horizontal part of the evaporation side passage (71) located in the vertical middle thereof, and the evaporator fans (45) are disposed in a horizontal part of the evaporation side passage (71) located in an upper part thereof.

Provided in the upper part of the refrigeration unit body (31) is a partition plate (73) separating the condensation side passage (70) form the evaporation side passage (71).

The partition plate (73) is disposed in the upper part of the refrigeration unit body (31), formed to extend from the front side of the evaporator (43) to the evaporator fans (45) and the condenser fans (44) and made of a heat insulating material.

Figure 6:
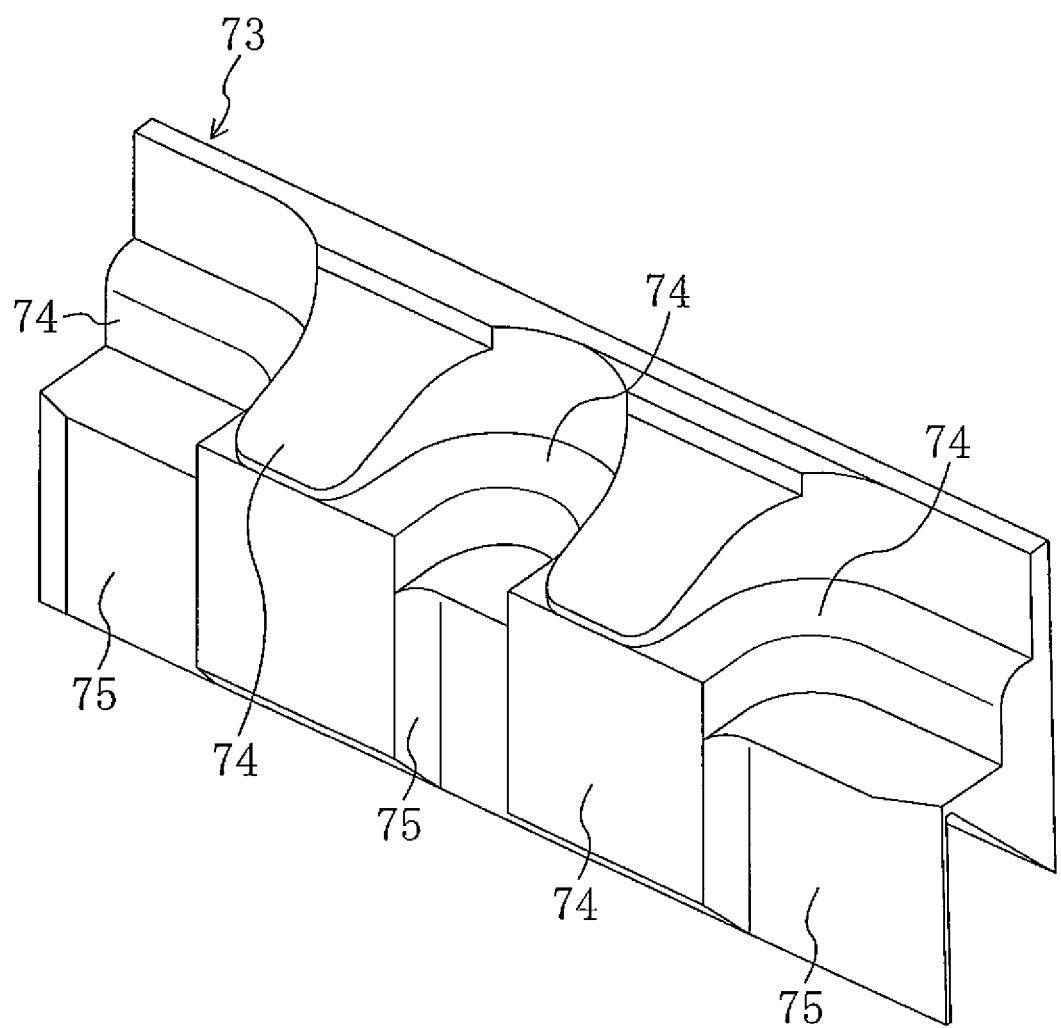
FIG. 6 is a perspective view showing a partition plate in Embodiment 1 as viewed from the front.
Figure 7:
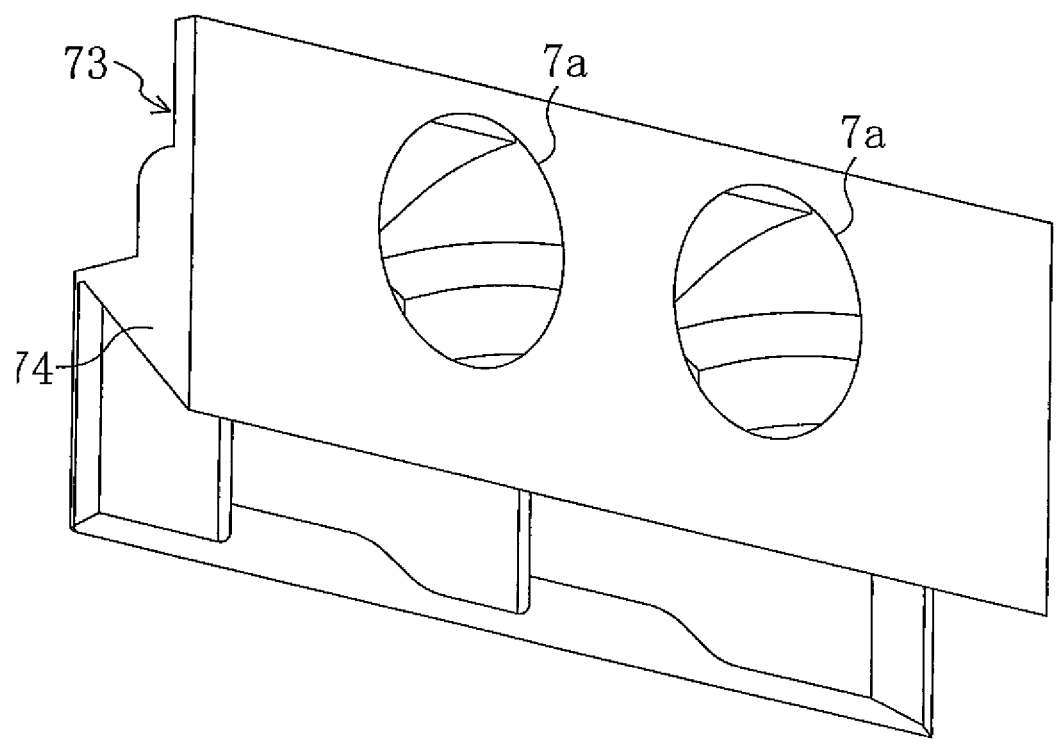
FIG. 7 is a perspective view showing the partition plate in Embodiment 1 as viewed from the back.
Figure 8:
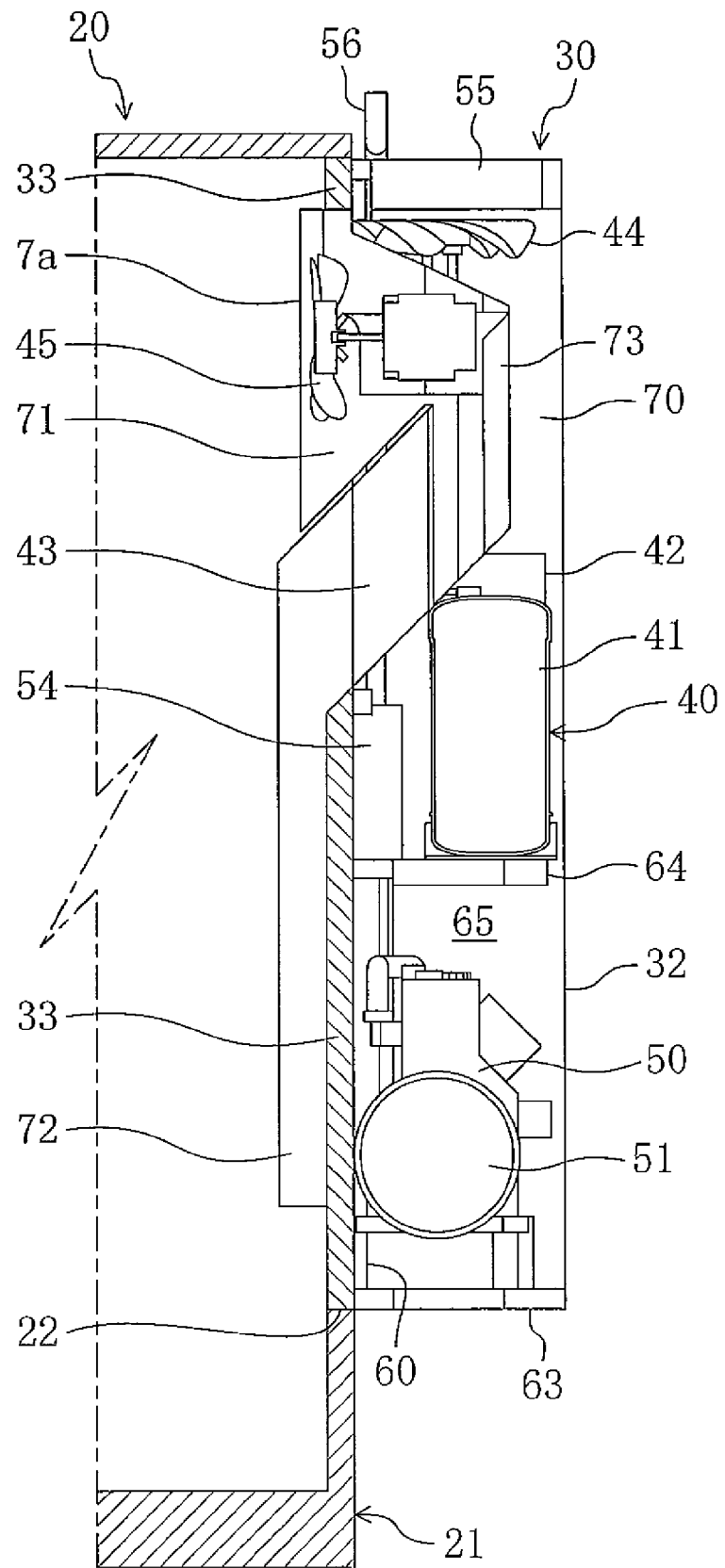
FIG. 8 is a partly omitted cross-sectional view taken along the line A-A of FIG. 2.
Figure 9:
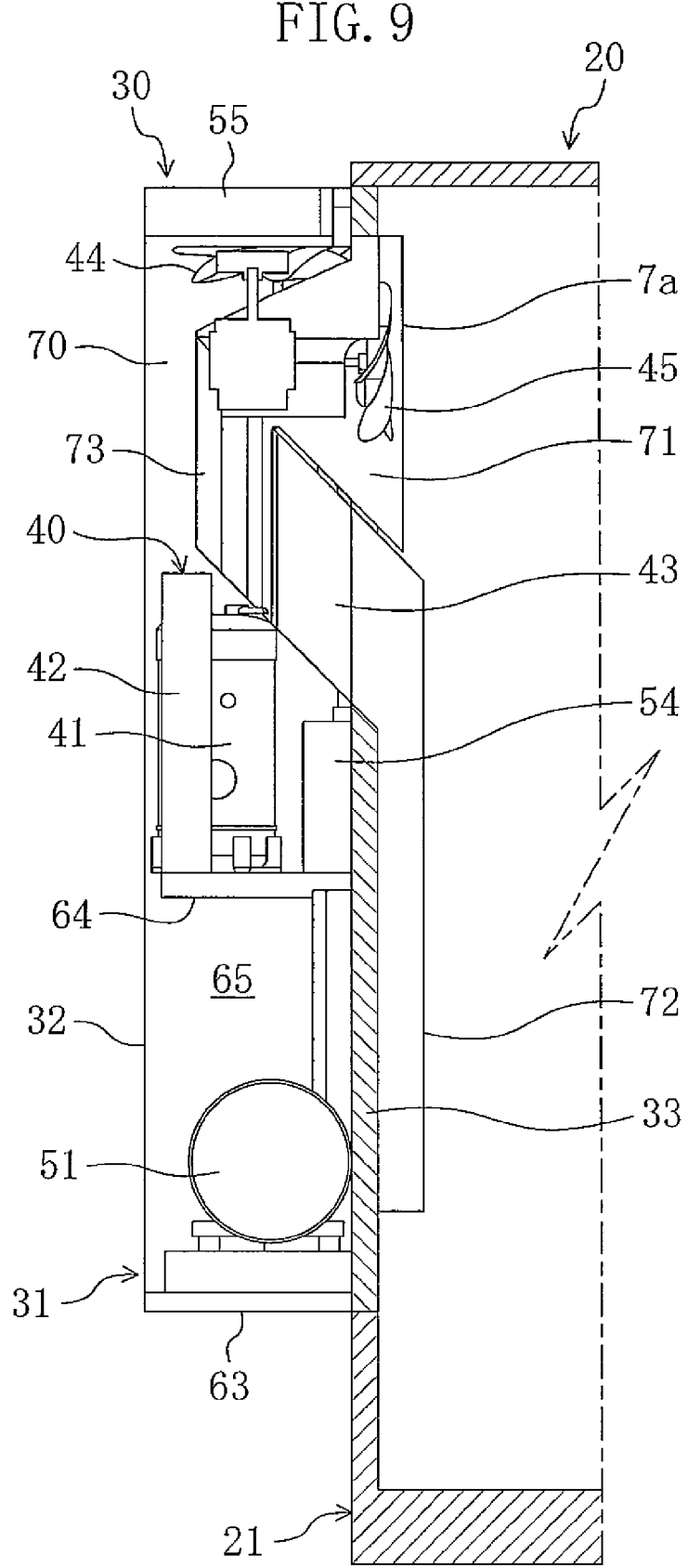
FIG. 9 is a partly omitted cross-sectional view taken along the line B-B of FIG. 2.
Figure 10:
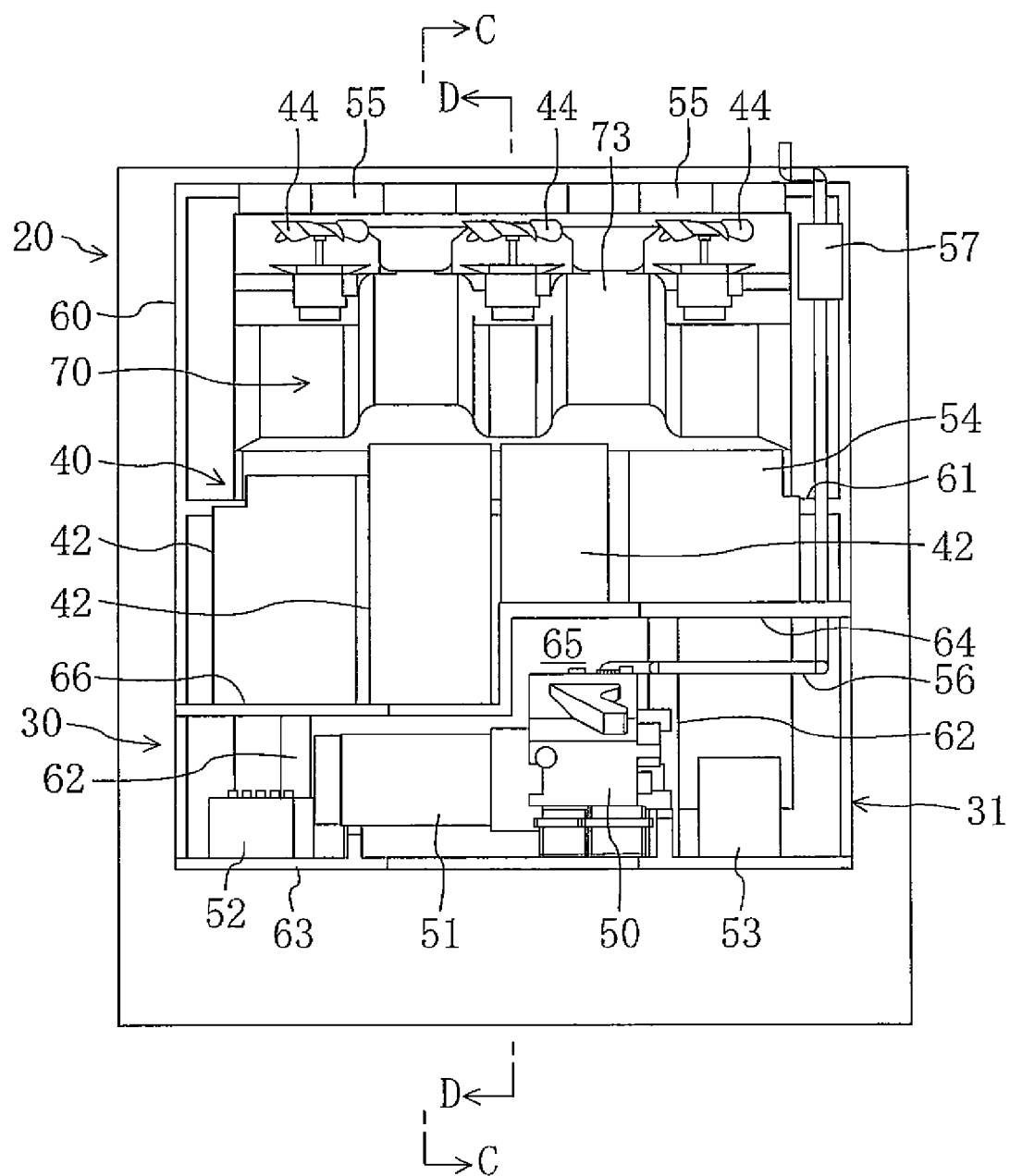
FIG. 10 is a partly omitted, front view showing a refrigeration unit according to Embodiment 2.
Figure 11:
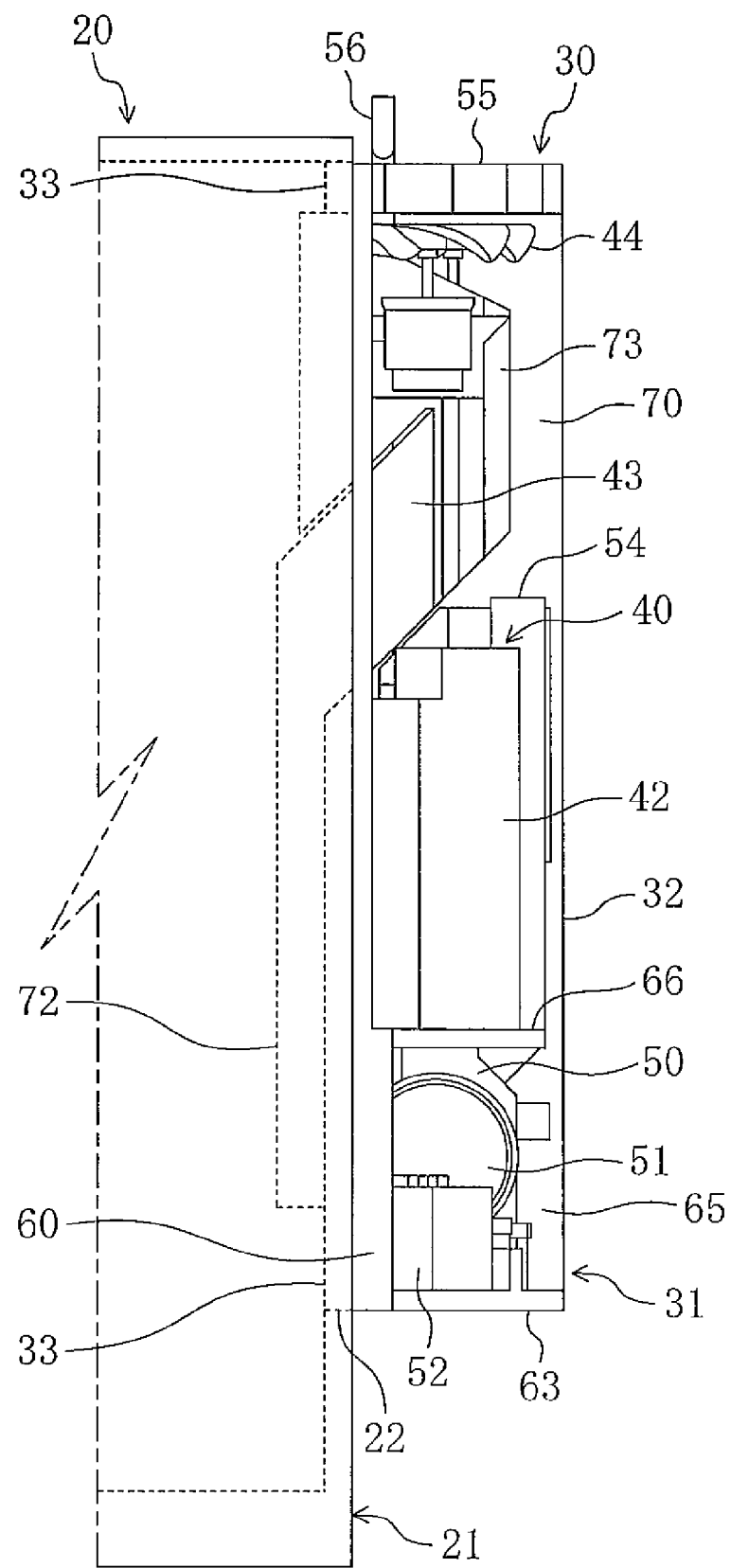
FIG. 11 is a partly omitted, left side view showing the refrigeration unit according to Embodiment 2.
Figure 12:
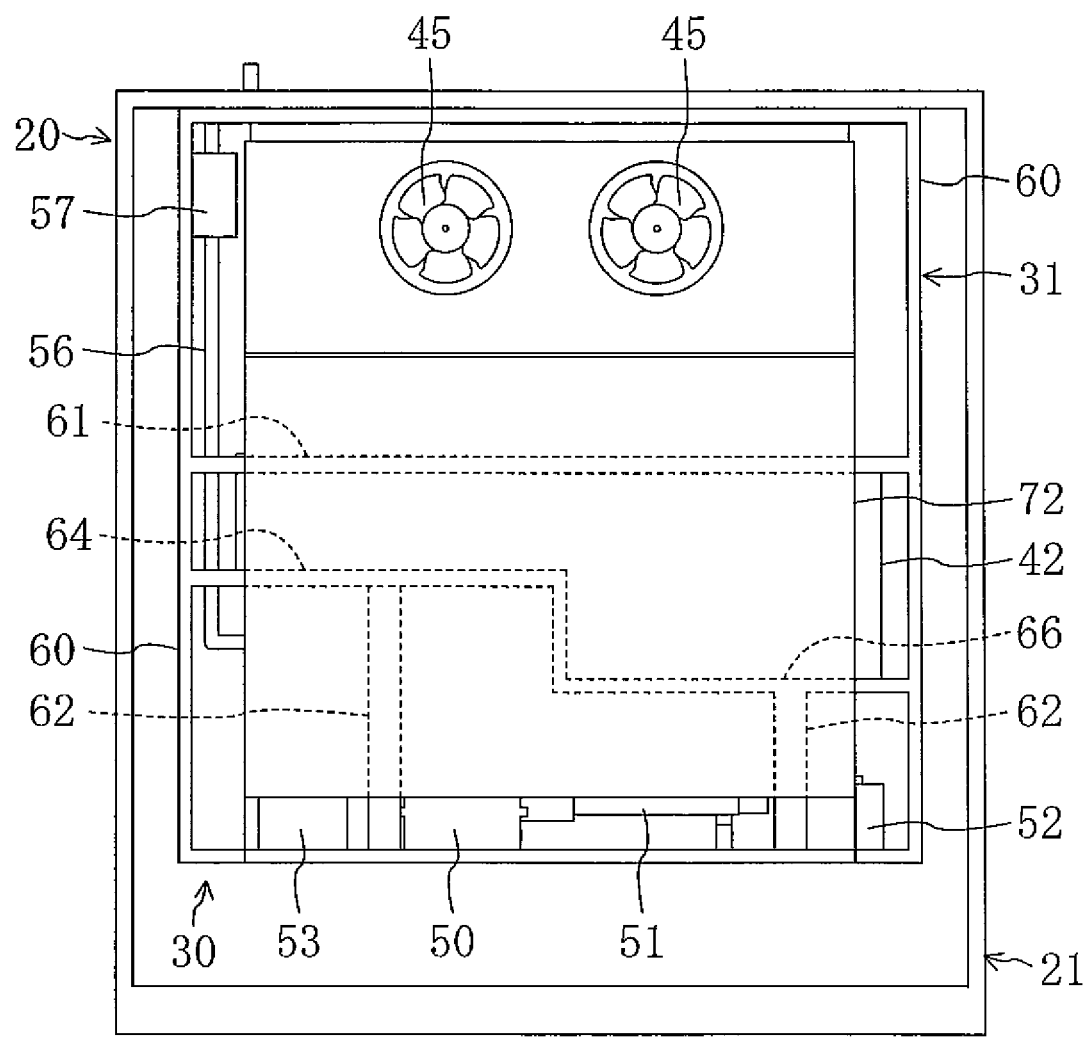
FIG. 12 is a partly omitted, back view showing the refrigeration unit according to Embodiment 2.
Figure 13:
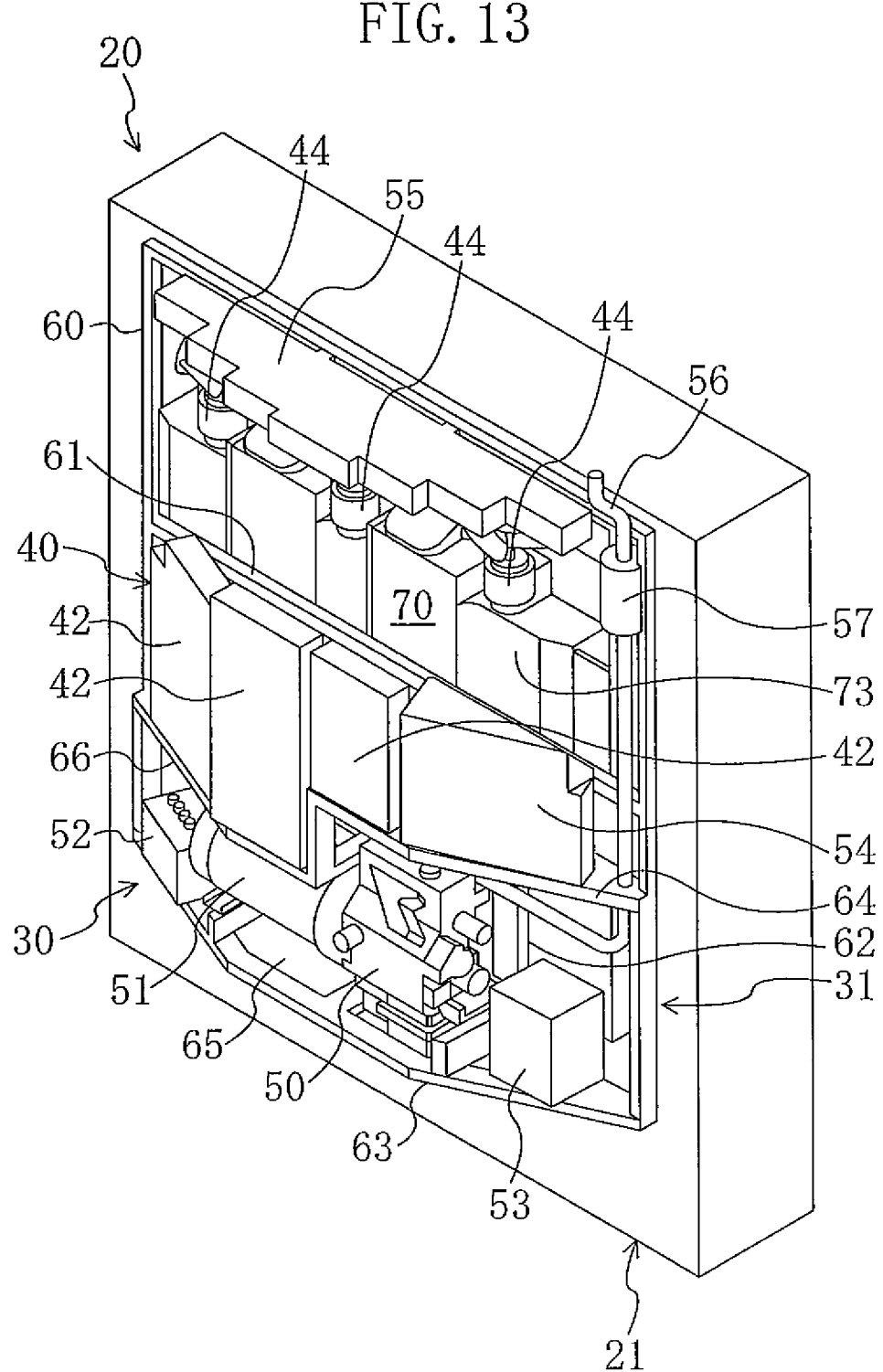
FIG. 13 is a partly omitted, perspective view showing the refrigeration unit according to Embodiment 2
Figure 14:
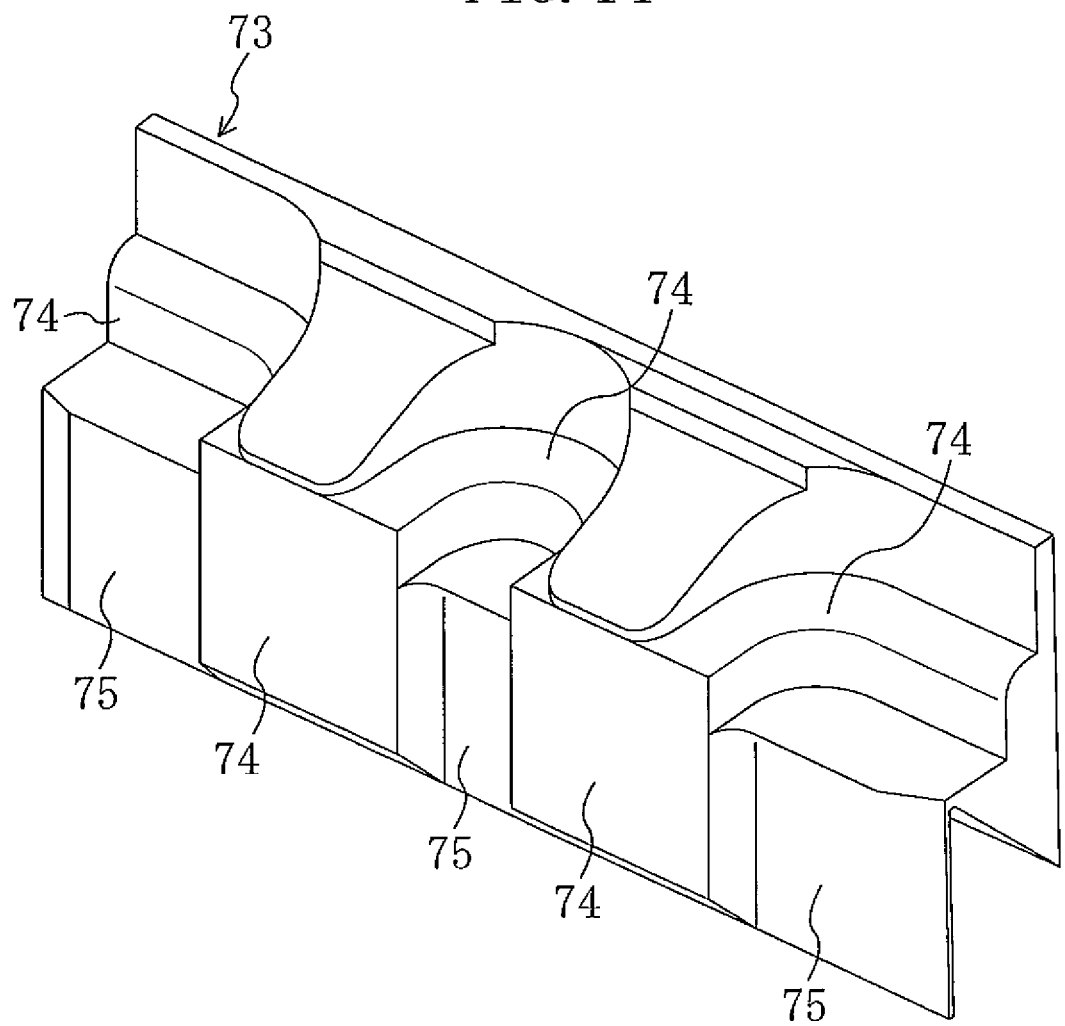
FIG. 14 is a perspective view showing a partition plate in Embodiment 2 as viewed from the front.
Figure 15:
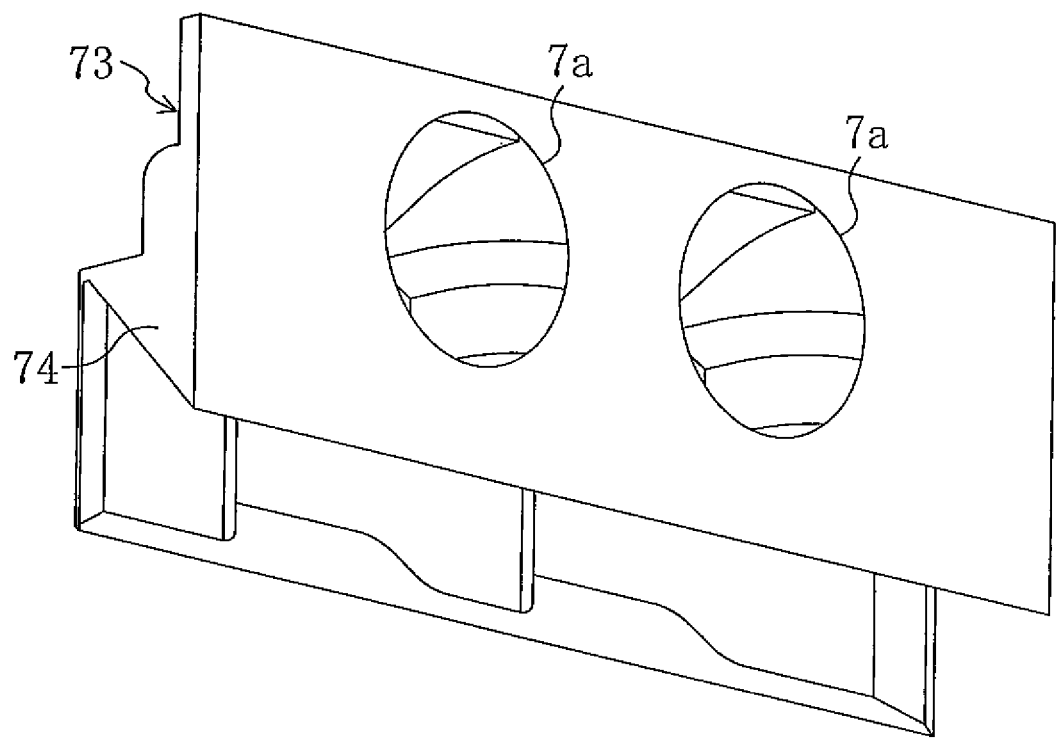
FIG. 15 is a perspective view showing the partition plate in Embodiment 2 as viewed from the back.
Figure 16:
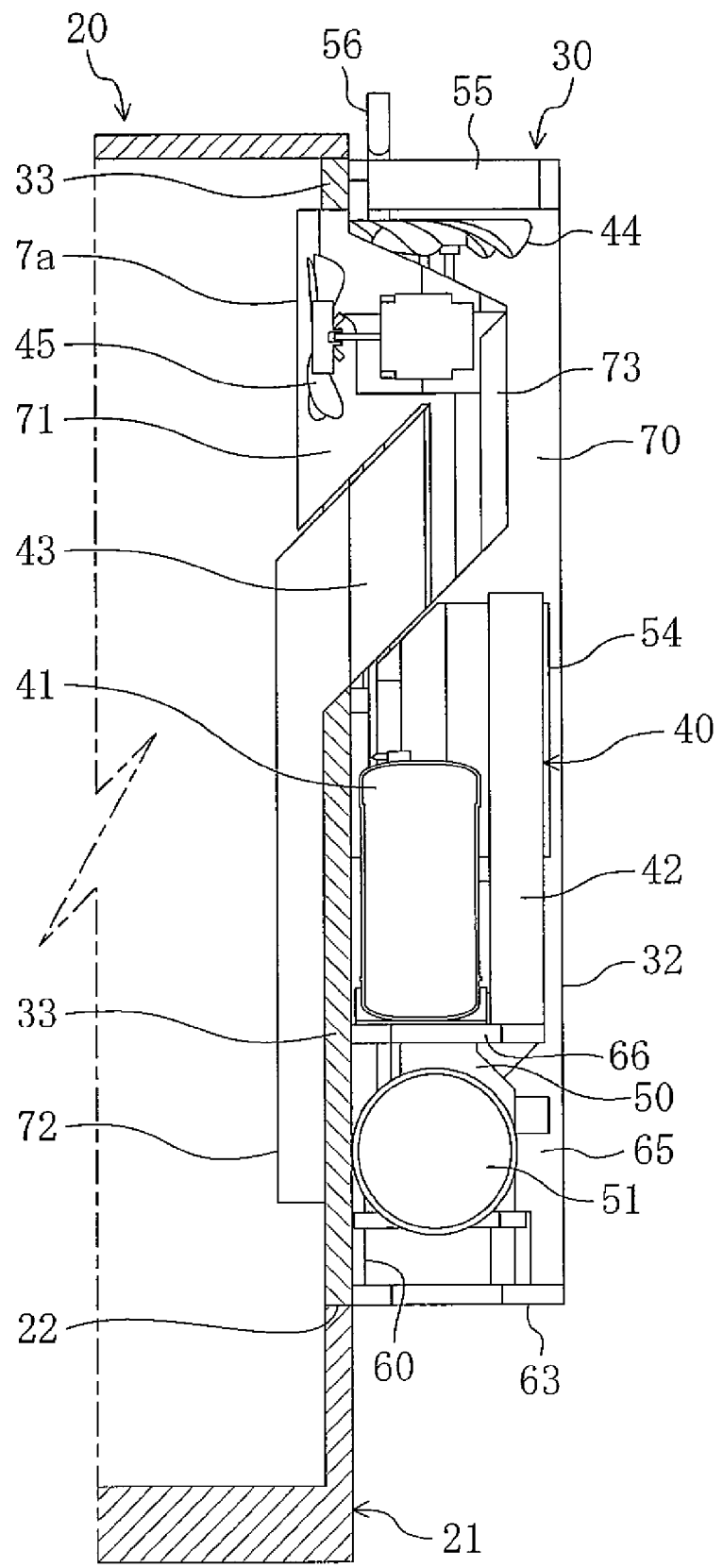
FIG. 16 is a partly omitted cross-sectional view taken along the line C-C of FIG. 10.
Figure 17:
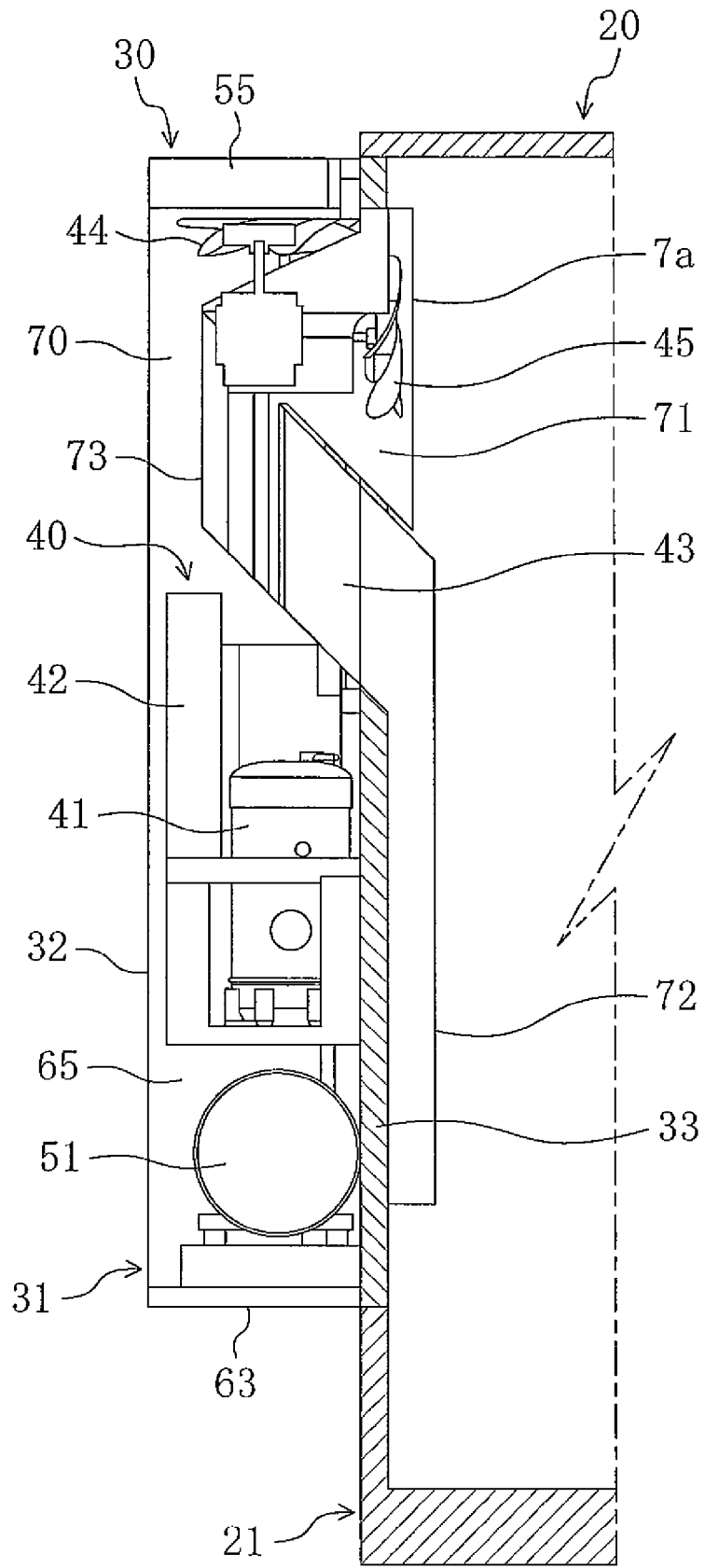
FIG. 17 is a partly omitted cross-sectional view taken along the line D-D of FIG. 10.
Figure 18:
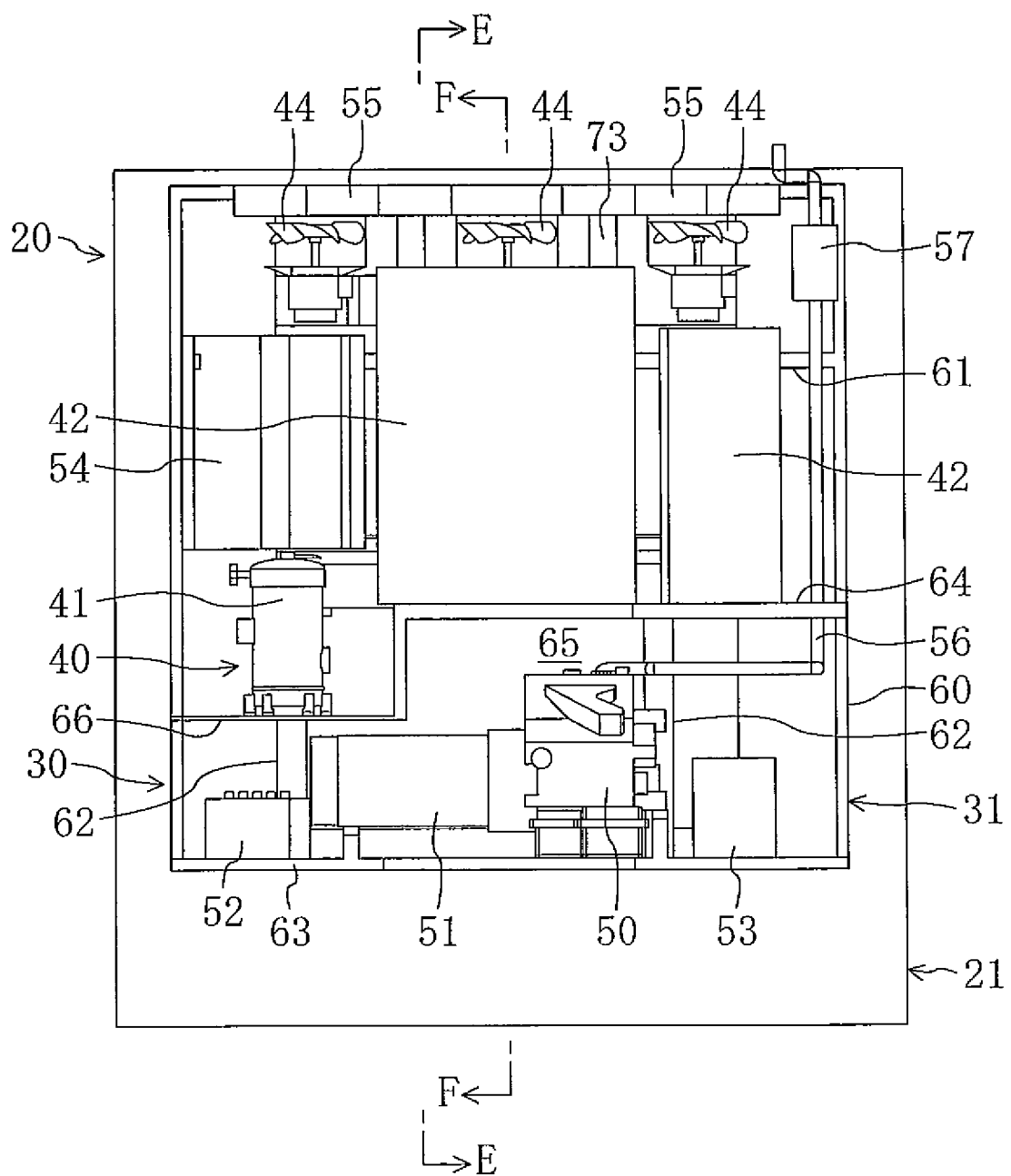
FIG. 18 is a partly omitted, front view showing a refrigeration unit according to Embodiment 3.
Figure 19:
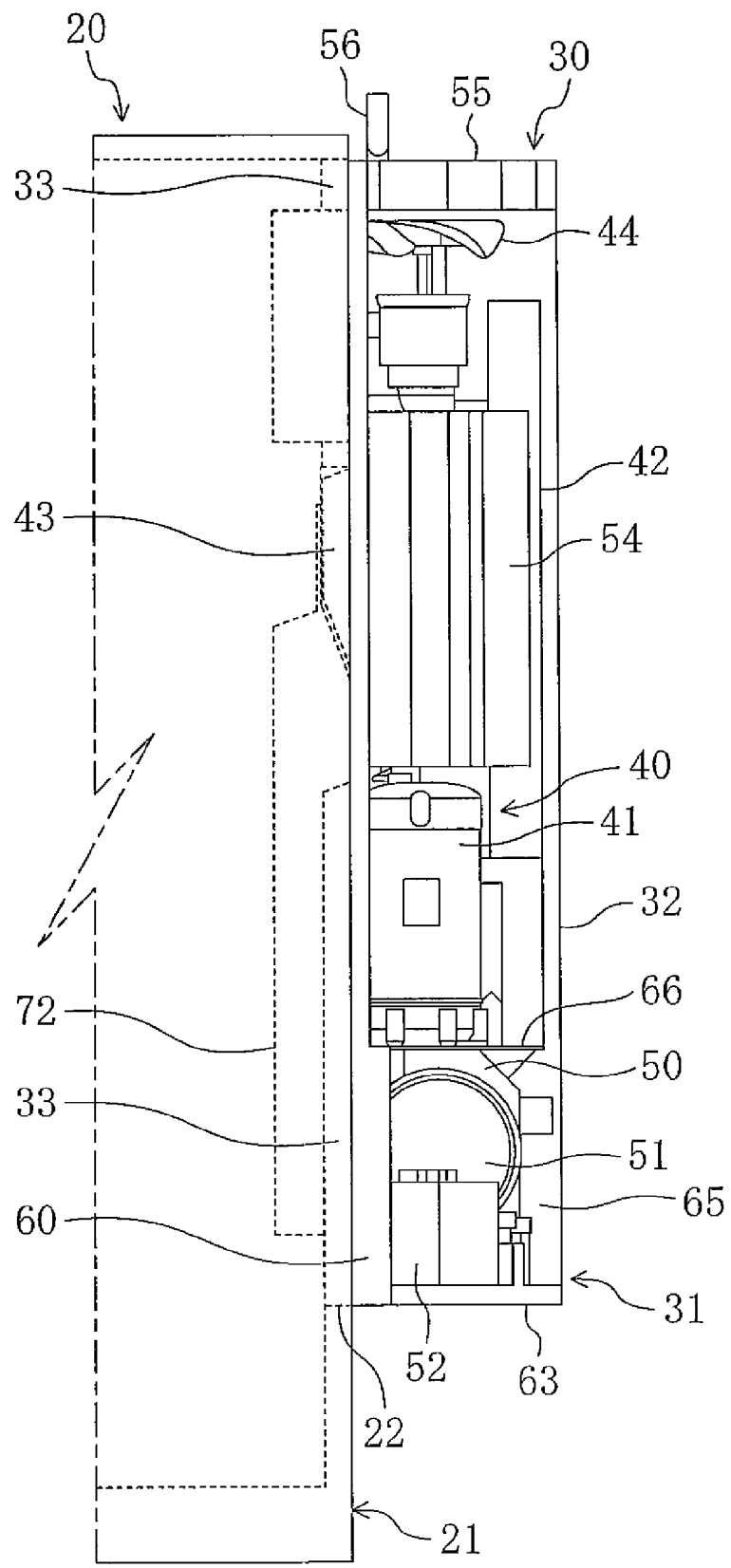
FIG. 19 is a partly omitted, left side view showing the refrigeration unit according to Embodiment 3.
Figure 20:
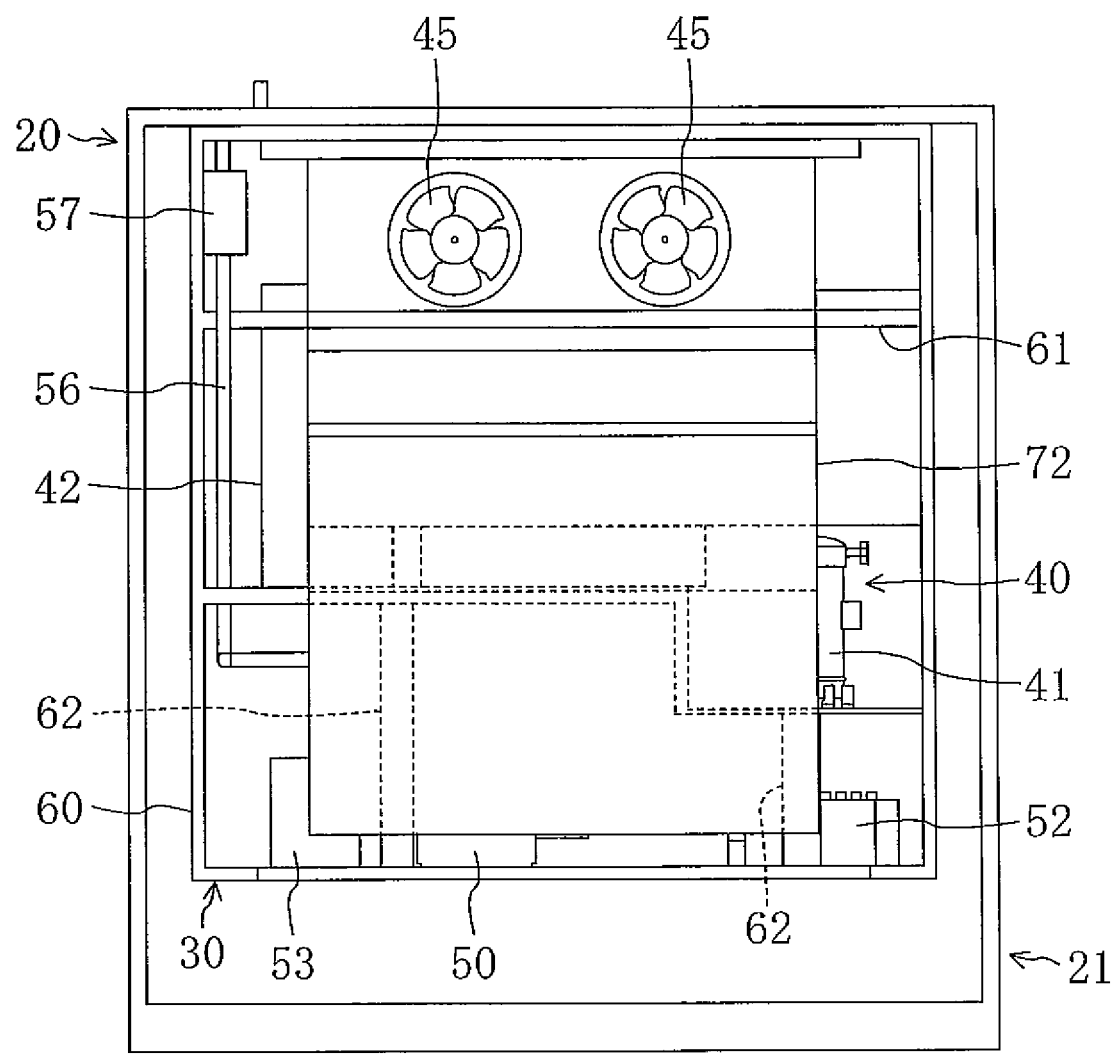
FIG. 20 is a partly omitted, back view showing the refrigeration unit according to Embodiment 3.
Figure 21:
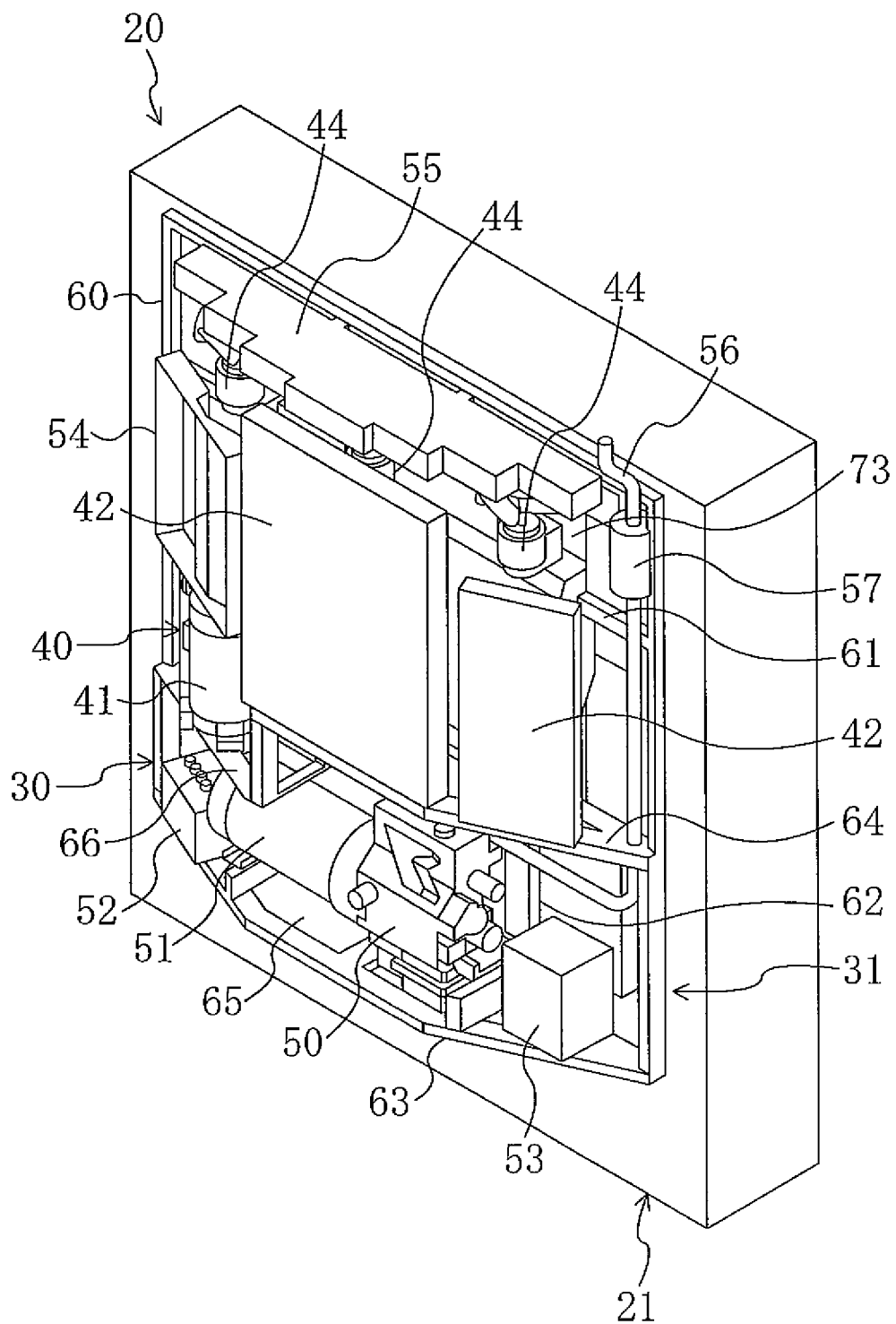
FIG. 21 is a partly omitted, perspective view showing the refrigeration unit according to Embodiment 3.
Figure 22:
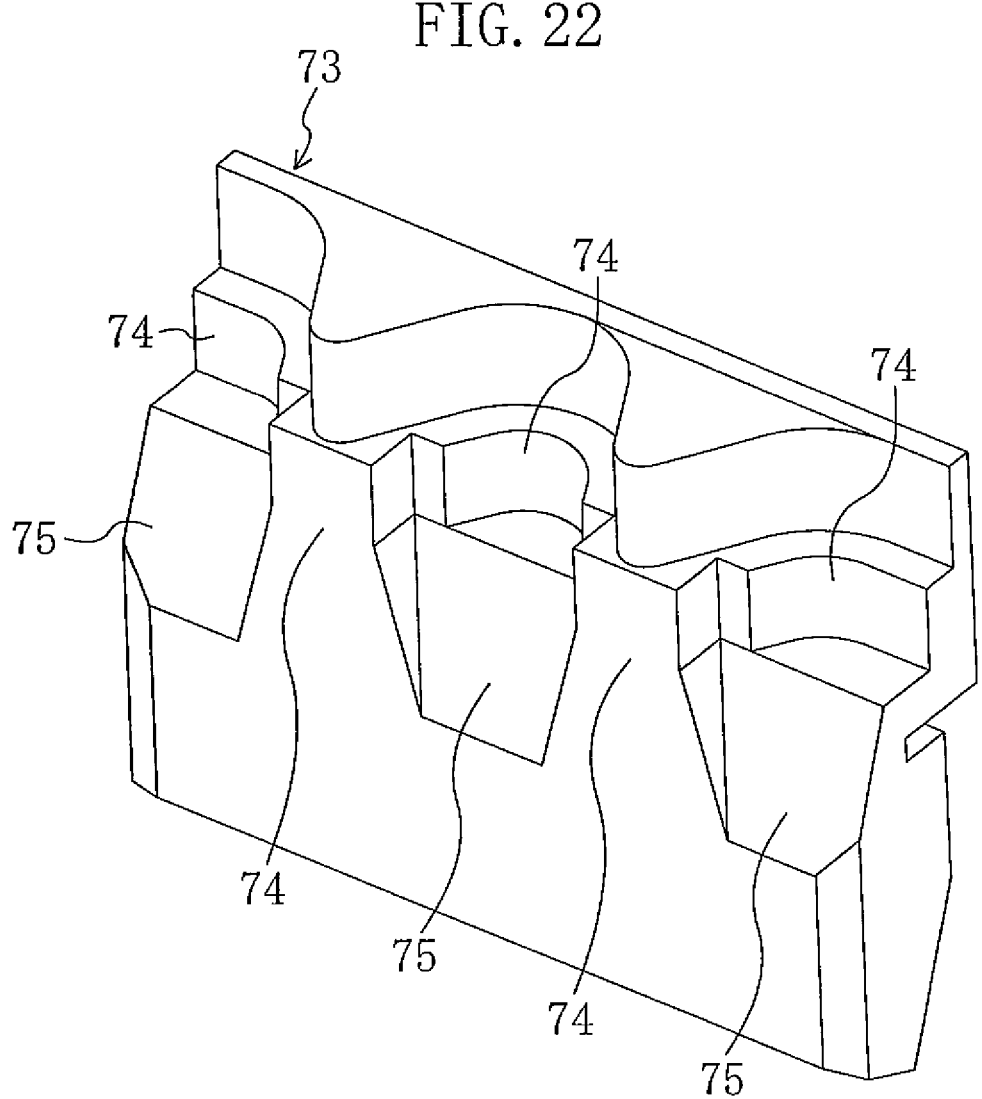
FIG. 22 is a perspective view showing a partition plate in Embodiment 3 as viewed from the front.
Figure 23:
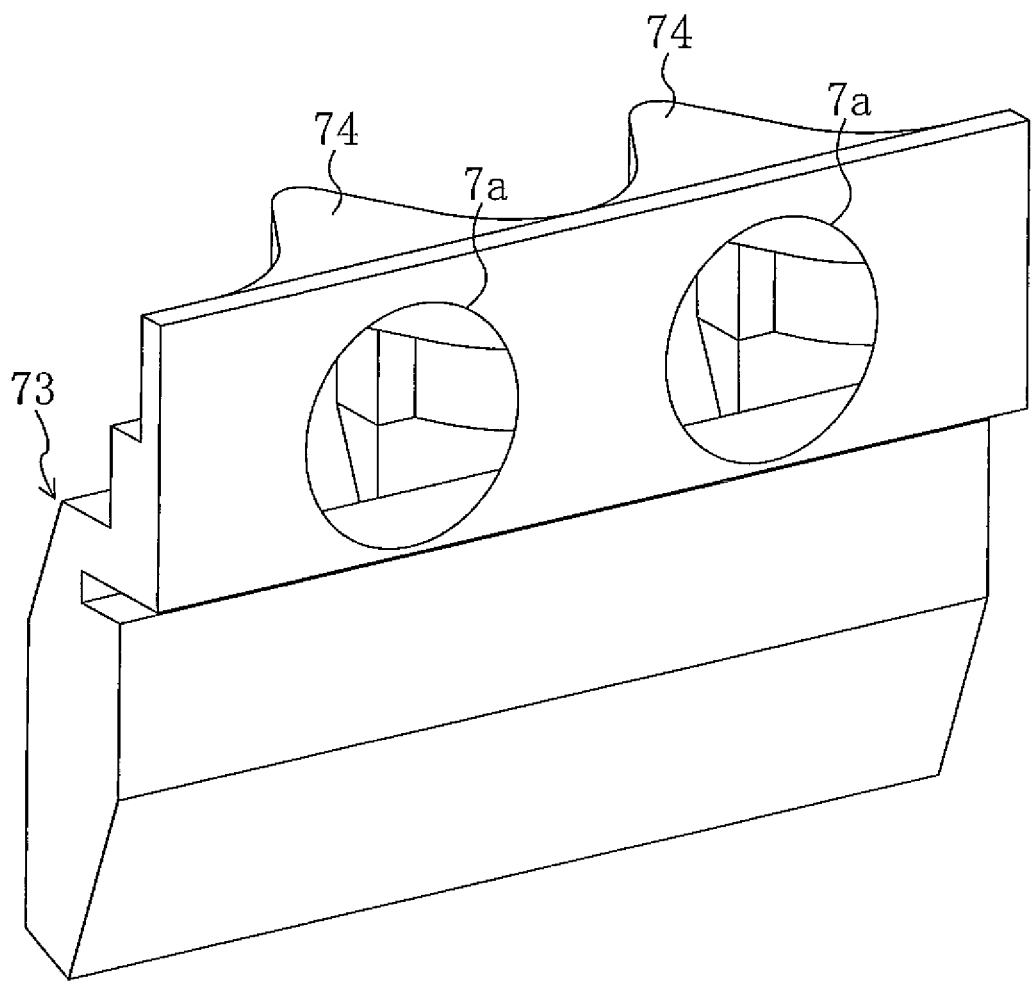
FIG. 23 is a perspective view showing the partition plate in Embodiment 3 as viewed from the back.

As shown in FIG. 6, the partition plate (73) is formed in a three-dimensional shape according to air flows in the evaporator (43) and the condensers (42). Particularly, the partition plate (73) has fan accommodation parts (74) formed alternately concavely and convexly in the width direction so that the two evaporator fans (45) and the three condenser fans (44) are alternately arranged in the width direction. The evaporator fans (45) are disposed to face backward with their rotational shafts extending horizontally, while the condenser fans (44) are disposed to face upward with their rotational shafts extending vertically.

The front surface of the partition plate (73) forms part of the condensation side passage (70), while the back surface thereof forms part of the evaporation side passage (71). Furthermore, the partition plate (73) has dents (75) formed on the front side thereof to expand the condensation side passage (70).

The refrigeration unit body (31) is provided with an exhaust pipe (56). The exhaust pipe (56) is provided to extend from the engine (50) to the upper end of the refrigeration unit body (31) and includes a muffler (57). The exhaust pipe (56) is configured to discharge exhaust air of the engine (50) to above the refrigeration unit body (31). Furthermore, although not shown, a heat exhaust passage is provided along the exhaust pipe (56). The heat exhaust passage is provided in the refrigeration unit body (31) from the engine (50) to the upper end of the refrigeration unit body (31). Furthermore, the heat exhaust passage is configured to discharge exhaust heat of the engine (50) and the electric generator (51) to above the refrigeration unit body (31) by stack effect due to high heat of the muffler (57).

The back surface of the refrigeration unit body (31) has a service opening formed therein for maintenance of the electrical component box (54), although not shown.

—Operational Behavior—

Next, a description is given of the behavior of the refrigeration unit (30). When the engine (50) is activated, the electric generator (51) generates electric power and the electric power from the electric generator (51) is then supplied to the compressor (41), the condenser fans (44) and the evaporator fans (45). Then, when the compressor (41) is driven, the refrigerant circuit (40) operates in a refrigeration cycle, whereby refrigerant condenses in the condensers (42) and evaporates in the evaporator (43), thereby producing cooled air.

On the other hand, when the evaporator fans (45) are actuated, air in the refrigerated compartment of the trailer body (21) is taken into the intake duct (72), flows through the intake duct (72) and is then cooled by the evaporator (43). The cooled air passes through the evaporator fans (45) and is then blown out through the outlets (7a) into the trailer body (21) to cool the interior of the trailer body (21).

Furthermore, when the condenser fans (44) are actuated, outside air is taken into the condensation side passage (70) and exchanges heat with refrigerant in the condenser (42), whereby the refrigerant releases heat to raise the temperature of the air. The air raised in temperature passes through the electrical component box (54) and the evaporator fans (45), then passes through the radiator (55) and is then blown out above the refrigeration unit body (31).

The exhaust heat from the engine (50) and the electric generator (51) passes through the heat exhaust passage extending along the exhaust pipe (56) and the muffler (57) and is then blown out above the refrigeration unit body (31).

Effects of Embodiment 1

As described so far, according to this embodiment, since the condensation side passage (70) is formed in the refrigeration unit body (31) from the front surface to the top thereof, the refrigeration unit body (31) can be reduced in thickness and can surely be prevented from the occurrence of short circuit.

Since the condensers (42) and the electrical component box (54) are disposed in series with the condenser fans (44) and the radiator (55), a sufficient amount of air flow can be obtained with a small amount of power, thereby providing efficient heat exhaust.

Furthermore, since the radiator (55) is disposed on the downstream side of the condensation side passage (70), exhaust heat can surely be discharged.

Since the condenser fans (44) and the evaporator fans (45) are disposed alternately in the width direction of the refrigeration unit body (31), this provides space saving and in turn reduces the thickness of the refrigeration unit body (31).

Furthermore, since the partition plate (73) is formed in a three-dimensional shape to effectively form an air passage, the air flow can be smoothened.

Since the refrigeration unit body (31) is formed in a frame structure, it can be toughened, can be unitized and can surely be joined to the trailer body (21).

Furthermore, since the heat exhaust passage is formed along the exhaust pipe (56), heat exhaust can surely be carried out by stack effect due to high heat of the muffler (57).

Since the service opening is formed in the refrigeration unit body (31), the maintenance of the electrical component box (54) can be easily carried out.

Furthermore, since the heat insulating wall (33) forms part of the front wall of the trailer (20), the part of the front wall of the trailer (20) can be dispensed with, thereby reducing the cost. In addition, the frame of the refrigeration unit body (31) can be used also as the front frame of the trailer (20), whereby the front frame of the trailer (20) can be dispensed with.

Embodiment 2 of the Invention

Next, Embodiment 2 of the present invention is described in detail with reference to the drawings.

In this embodiment, as shown in FIGS. 10 to 17, the electrical component box (54) is, instead of being disposed behind the condensers (42) in Embodiment 1, disposed lateral to the condensers (42).

Specifically, the middle-stage frame (64) of the refrigeration unit body (31) includes a step-down part (66) formed in one side thereof. Two condensers (42) are disposed on the step-down part (66) and a condenser (42) and an electrical component box (54) are disposed on the other side of the middle-stage frame (64). Therefore, the maintenance of the electrical component box (54) can be easily carried out from the front side of the refrigeration unit body (31).

Disposed on the step-down part (66) is also a compressor (41) behind the condensers (42). The back surface of the refrigeration unit body (31) has a service opening formed therein for replacement of the compressor (41) or any other purpose, although not shown. The other structures, operations and effects are the same as in Embodiment 1.

Embodiment 3 of the Invention

Next, Embodiment 3 of the present invention is described in detail with reference to the drawings.

In this embodiment, as shown in FIGS. 18 to 25, the evaporator (43) is, instead of being disposed vertically in Embodiment 1, disposed inclined.

Figure 24:
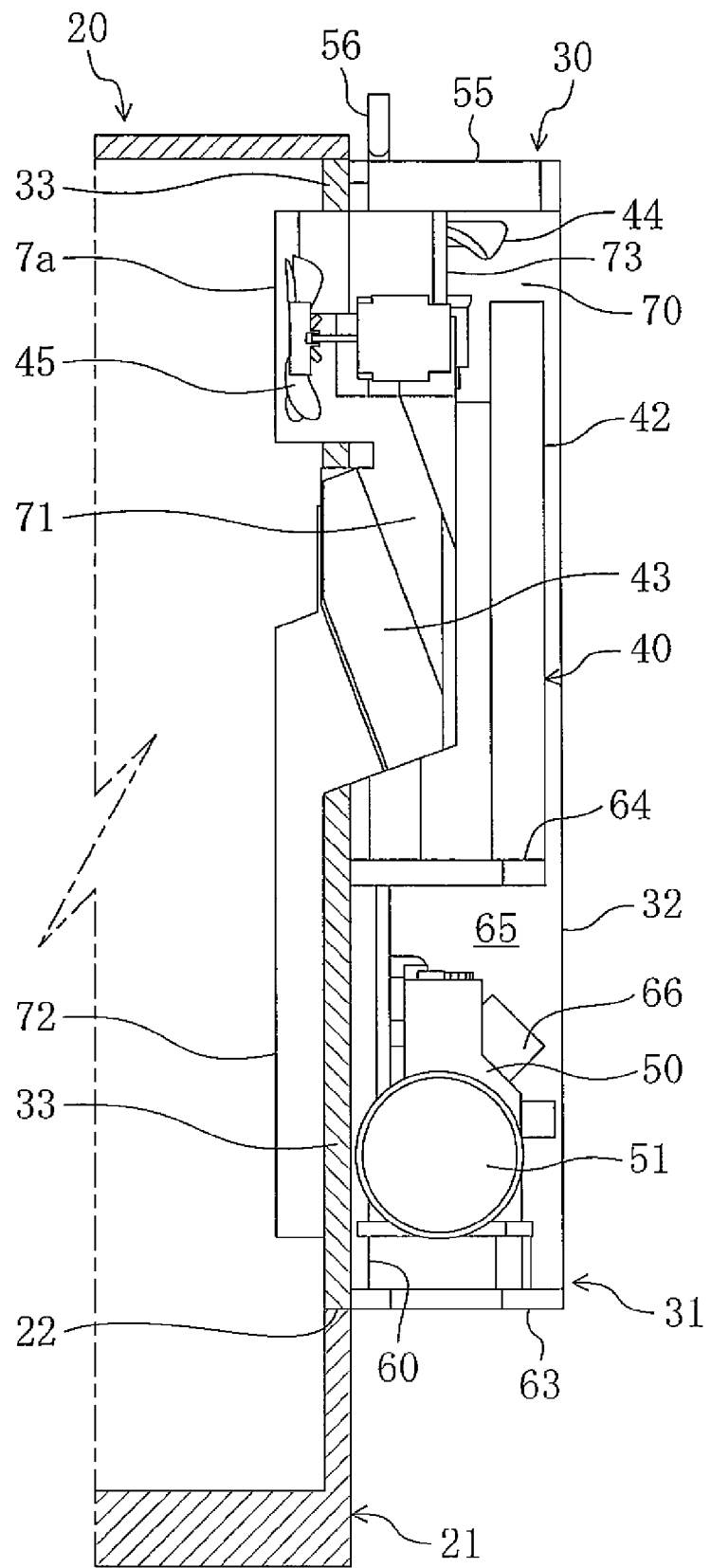
FIG. 24 is a partly omitted cross-sectional view taken along the line E-E of FIG. 18.
Figure 25:
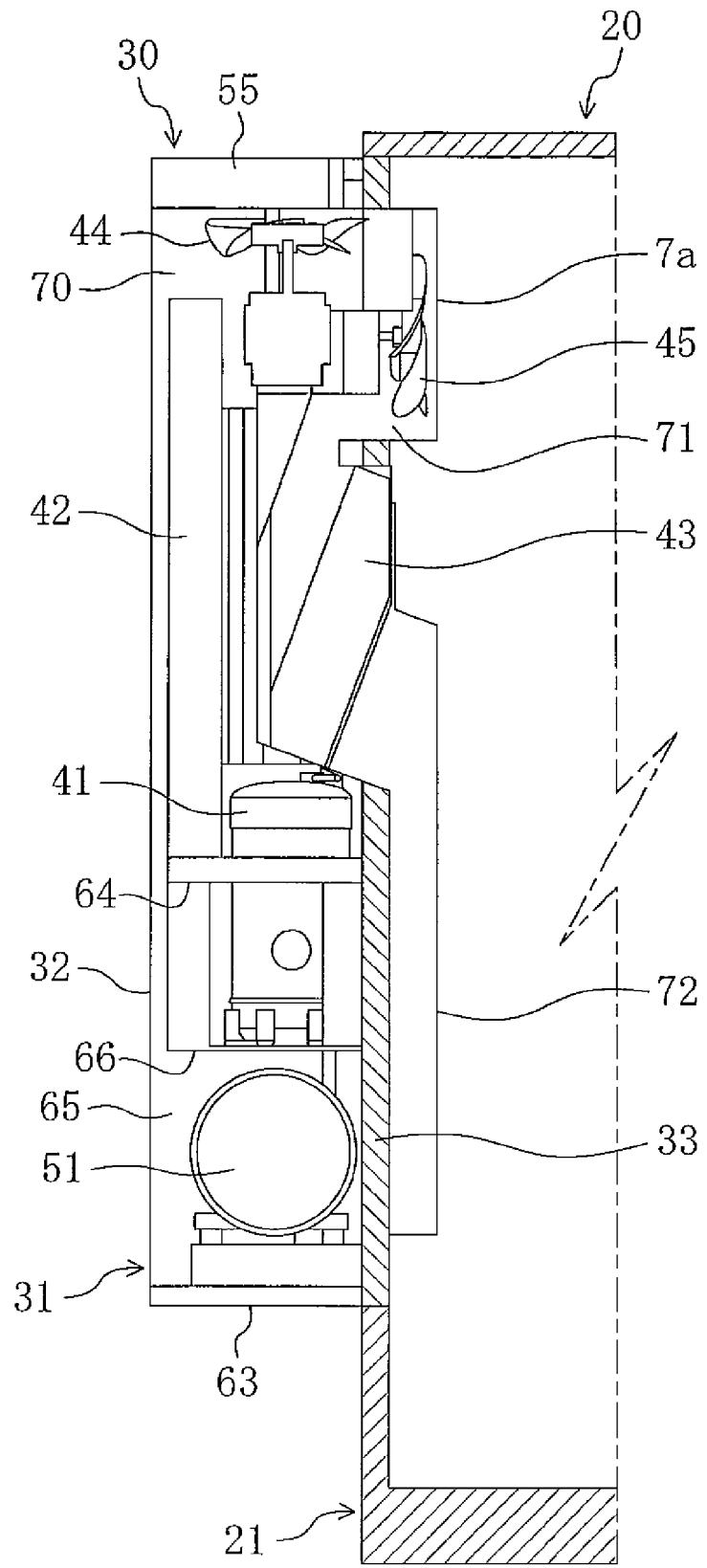
FIG. 25 is a partly omitted cross-sectional view taken along the line F-F of FIG. 18.

Specifically, as shown in FIG. 24, the evaporator (43) is disposed inclined with its top backwardly of its bottom, i.e., with its top extending towards the trailer body (21). For example, the evaporator (43) is inclined at an angle of 20°.

Furthermore, the intake duct (72) opens at an angle with the evaporator (43) and is configured so that the air in the refrigerated compartment of the trailer body (21) is guided to the entire surface of the evaporator (43).

Furthermore, the middle-stage frame (64) of the refrigeration unit body (31) includes a step-down part (66) formed in one side thereof. A compressor (41) is disposed on the step-down part (66) and an electrical component box (54) is disposed above the compressor (41). Therefore, the maintenance of the electrical component box (54) can be easily carried out from the front side of the refrigeration unit body (31).

Furthermore, two condensers (42) are disposed on the other side of the middle-stage frame (64). The other structures and operations are the same as in Embodiment 1.

Effects of Embodiment 3

As described so far, according to this embodiment, since the evaporator (43) is disposed inclined, the air in the refrigerated compartment of the trailer body (21) is guided to the entire surface of the evaporator (43), which ensures the area of heat exchange. In addition, the evaporator (43) can be reduced in depth and can be increased in height, which provides effective space utilization. The other effects are the same as in Embodiment 1.

Other Embodiments

Each of the above embodiments of the present invention may have the following configuration.

The number of condenser fans (44) and the number of evaporator fans (45) are not limited to those in the above embodiments.

The above embodiments are merely preferred embodiments in nature and are not intended to limit the scope, applications and use of the invention.

INDUSTRIAL APPLICABILITY

As can be seen from the above description, the present invention is useful for a trailer refrigeration unit for cooling the interior of a trailer.

The invention claimed is:

1. A trailer refrigeration unit that has a refrigeration unit body containing a refrigerant circuit operable in a vapor compression refrigeration cycle and an engine for driving a compressor of the refrigerant circuit and is configured to cool the interior of a trailer, the refrigeration unit body having a condensation side passage formed therein from a front surface to a top of the refrigeration unit body to allow air exchanging heat with a condenser of the refrigerant circuit to flow, the condensation side passage being configured so that the air having flowed through the condenser then flows through a radiator for the engine wherein, the radiator is disposed at the top of the refrigeration unit body, the refrigeration unit body has an evaporation side passage formed therein to allow air exchanging heat with an evaporator of the refrigerant circuit to flow, and a partition plate separating the condensation side passage from the evaporation side passage in a front to back direction thereof, the partition plate being formed in a three-dimensional shape according to air flows in the condenser and the evaporator, and the partition plate has fan accommodation parts formed alternately concavely and convexly in a width direction of the refrigeration unit body, and, a condenser fan for the condenser in the condensation side passage and an evaporator fan for the evaporator in the evaporation side passage are arranged in a width direction of the refrigeration unit body.

2. The trailer refrigeration unit of claim 1, wherein the condenser, a condenser fan for the condenser and the radiator are disposed in series in the condensation side passage and in this order from upstream to downstream of air flow.

3. The trailer refrigeration unit of claim 1, wherein a condenser fan for the condenser is disposed in the condensation side passage and an electrical component box is disposed in the condensation side passage upstream of the condenser fan.

4. The trailer refrigeration unit of claim 1, wherein the evaporator of the refrigerant circuit is disposed inclined with the top thereof backwardly of the bottom thereof.

5. The trailer refrigeration unit of claim 1, wherein the refrigeration unit body includes structural members formed in a frame structure including a frame.

6. The trailer refrigeration unit of claim 5, wherein the frame is configured to be joined to the trailer.

7. The trailer refrigeration unit of claim 1, wherein
the refrigeration unit body further contains an electric generator capable of being driven by the engine, and
a heat exhaust passage for the engine and the electric generator is formed in the refrigeration unit body along an exhaust pipe of the engine and opens at the top of the refrigeration unit body to guide exhaust heat upward.

8. The trailer refrigeration of claim 1, wherein a heat insulating wall is provided on a back side of the refrigeration unit body located towards the trailer.

9. The trailer refrigeration unit of claim 1, wherein an inlet of the condensation side passage is formed at the front surface of the refrigeration unit body and an outlet of the condensation side passage is formed at a top surface of the refrigeration unit body.

10. The trailer refrigeration unit of claim 1, wherein a plurality of the evaporator fans and a plurality of the condenser fans are alternately arranged in the fan accommodation parts of the partition plate.

11. The trailer refrigeration unit of claim 1, wherein the evaporator fan is disposed to face backward and has rotational, shafts extending horizontally, and the condenser fan is disposed to face upward and has rotational shafts extending vertically.

* * * * *